US008768931B2

(12) United States Patent  (10) Patent No.: US 8,768,931 B2
Das et al.  (45) Date of Patent: Jul. 1, 2014

(54) REPRESENTING AND MANIPULATING RDF DATA IN A RELATIONAL DATABASE MANAGEMENT SYSTEM

(75) Inventors: Souripriya Das, Nashua, NH (US); Eugene Inseok Chong, Concord, MA (US); Zhe Wu, Westford, MA (US); Melliyal Annamalai, Nashua, NH (US); Jogannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/323,707

(22) Filed: Dec. 12, 2011

(65) Prior Publication Data

US 2012/0117081 A1    May 10, 2012

Related U.S. Application Data

(62) Division of application No. 12/188,927, filed on Aug. 8, 2008, now Pat. No. 8,078,646.

(51) Int. Cl.
    *G06F 17/30* (2006.01)
(52) U.S. Cl.
    USPC ............ 707/747; 707/705; 707/736; 707/802
(58) Field of Classification Search
    CPC .......... G06F 17/3033; G06F 17/30595; G06F 11/0751; G06F 3/0641
    USPC ......................................... 707/802, 705, 736
    See application file for complete search history.

(56) References Cited

U.S. PATENT DOCUMENTS

| 4,764,863 | A | * | 8/1988 | Silverthorn et al. ............ 714/39 |
| 5,920,900 | A | * | 7/1999 | Poole et al. .................... 711/216 |
| 7,640,262 | B1 | * | 12/2009 | Beaverson et al. .................... 1/1 |
| 7,725,416 | B2 | * | 5/2010 | Buss ............................... 706/47 |
| 2002/0120598 | A1 | | 8/2002 | Shadmon et al. |
| 2003/0229529 | A1 | | 12/2003 | Mui et al. |
| 2004/0103105 | A1 | | 5/2004 | Lindblad et al. |
| 2004/0153452 | A1 | * | 8/2004 | Carro ................................ 707/9 |
| 2005/0131583 | A1 | | 6/2005 | Ransom |
| 2005/0141519 | A1 | * | 6/2005 | Rajgopal et al. ......... 370/395.32 |
| 2005/0187926 | A1 | | 8/2005 | Britton et al. |
| 2006/0106876 | A1 | | 5/2006 | MacGregor |

(Continued)

OTHER PUBLICATIONS

Craig Sayers et al., "The Case for Generating URIs by Hashing RDF Content", Technical Report, Aug. 2002, Hewlett Packard Labs.

(Continued)

*Primary Examiner* — Shyue Jiunn Hwa
(74) *Attorney, Agent, or Firm* — Vista IP Law Group, LLP

(57) ABSTRACT

Techniques for generating hash values for instances of distinct data values. In the techniques, each distinct data value is mapped to hash value generation information which describes how to generate a unique hash value for instances of the distinct data value. The hash value generation information for a distinct data value is then used to generate the hash value for an instance of the distinct data value. The hash value generation information may indicate whether a collision has occurred in generating the hash values for instances of the distinct data values and if so, how the collision is to be resolved. The techniques are employed to normalize RDF triples by generating the UIDS employed in the normalization from the triples' lexical values.

26 Claims, 22 Drawing Sheets

(56) References Cited

U.S. PATENT DOCUMENTS

| | | | |
|---|---|---|---|
| 2006/0184556 A1* | 8/2006 | Tan et al. | 707/101 |
| 2008/0098015 A1* | 4/2008 | Davis et al. | 707/100 |
| 2008/0126397 A1 | 5/2008 | Alexander et al. | |
| 2008/0243908 A1* | 10/2008 | Aasman et al. | 707/102 |
| 2008/0294644 A1* | 11/2008 | Liu et al. | 707/10 |
| 2009/0132474 A1 | 5/2009 | Ma et al. | |
| 2010/0036788 A1* | 2/2010 | Wu et al. | 706/47 |
| 2011/0099175 A1* | 4/2011 | Darcy | 707/747 |
| 2012/0023082 A1 | 1/2012 | Kotha et al. | |
| 2012/0110444 A1 | 5/2012 | Li et al. | |

OTHER PUBLICATIONS

David Beckett, "The Design and Implementation of the Redland RDF Application Framework", ACM, May 2001, pp. 449-456, Hong Kong.

Non-final Office Action dated Feb. 28, 2013 for U.S. Appl. No. 13/323,730.

Edward Fredkin et al., "Trie Memory", Communication of the ACM, Sep. 1960, 10 pages.

openRDF.org: Home, May 13, 2008, 3 pages url: http://openrdf.org/.

W3C, "RDF Primer" W3C Recommendation, Feb. 10, 2004, 52 pages url: http://www.w3.org/TR/rdf-primer/.

W3C, "SPARQL Query Language for RDF", W3C Recommendation, Jan. 15, 2008, 72 pages url: http://www.w3.org/TR/rdf-sparql-query/.

W3C, "RDF/XML Syntax Specification (Revised)", W3C Recommendation, Feb. 10, 2004, 31 pages url: http://www.w3.org/TR/REC-rdf-syntax/.

W3C, "W3C Semantic Web Activity", 4 pages, May 25, 2010 url: http://www.w3.org/2001/sw/.

Final Office Action dated Jul. 22, 2013 for U.S. Appl. No. 13/323,730.

Advisory Action dated Jul. 30, 2013 for U.S. Appl. No. 13/117,014.

Advisory Action dated Oct. 2, 2013 for U.S. Appl. No. 13/323,730.

Non-final Office Action dated Dec. 5, 2012 for U.S. Appl. No. 13/117,014.

Final Office Action dated May 20, 2013 for U.S. Appl. No. 13/117,014.

* cited by examiner

"Reviewer" RDF model 101

| Schema Triples | | |
|---|---|---|
| Subject | Predicate | Object |
| Reviewer | rdfs:subClassOf | Person |
| Faculty | rdfs:subClassOf | Reviewer |
| Student | rdfs:subClassOf | Reviewer |
| Ph.D. Student | rdfs:subClassOf | Student |
| ChairpersonOf | rdfs:domain | Person |
| ChairpersonOf | rdfs:range | Conference |
| ReviewerOf | rdfs:domain | Reviewer |
| ReviewerOf | rdfs:range | Conference |
| Age | rdfs:domain | Person |
| Age | rdfs:range | xsd:int |

| Data Triples | | |
|---|---|---|
| Subject | Predicate | Object |
| ICDE 2005 | rdf:type | Conference |
| John | Age | 24 |
| John | rdf:type | Ph.D.student |
| John | ReviewerOf | ICDE 2005 |
| Mary | rdf:type | Faculty |
| Mary | ChairpersonOf | ICDE 2005 |
| Mary | Age | 29 |
| Tom | Age | 22 |
| Tom | rdf:type | Ph.D.student |
| Tom | ReviewerOf | ICDE 2005 |
| Gary | Age | 23 |
| Gary | rdf:type | Ph.D.student |
| Gary | ReviewerOf | VLDB 2005 |
| Bob | Age | 21 |
| Bob | rdf:type | Ph.D.student |
| Bob | ReviewerOf | VLDB 2005 |

203

205 {
  207(1)   '(?r    ReviewerOf    ?c)
  207(2)    (?r    rdf:type    Ph.D.Student)
  207(3)    (?r    Age    ?a)', Prior Art
Figure 2

Concurrent bulk loading

Figure 4: RDBMS

LexValues 521

| lexval | id |
|---|---|
| John | 100 |
| Mary | 200 |
| managerOf | 300 |
| ... | ... |

IdTriples 501

| subj-id | pred-id | obj-id |
|---|---|---|
| 100 | 300 | 200 |
| ... | ... | ... |
|  |  |  |

Exemplary prior art

Figure 5

Global Tables

| | 812 | 813 | 814 | 815 |
|---|---|---|---|---|
| | ID | SDO_RDF_TRIPLE_S | source_db | ... |
| 811 | 1 | (model_id, a, b, c, link_id) | SourceDB23 | ... |
| | ... | ... | ... | ... |
| | | | | |

ApplicationTable 801

Exemplary ApplicationTable

Figure 8

```
CREATE TABLE stage_table (
      RDF$STC_sub varchar2(4000) not null,
      RDF$STC_pred varchar2(4000) not null,
      RDF$STC_obj varchar2(4000) not null,
);
```

901

```
CREATE TABLE stage_table_with_extra_cols (
      source VARCHAR2(4000),
      id NUMBER,
      RDF$STC_sub varchar2(4000) not null,
      RDF$STC_pred varchar2(4000) not null,
      RDF$STC_obj varchar2(4000) not null,
);
```

902

APIs for staging table

Figure 9

StagingTable 1001

| sub | pred | obj |
|---|---|---|
| <http://xyz.com/John> | <http://xyz.com/age> | "024"^^<http://www.w3.org/2001/XMLSchema#decimal> |
| ... | ... | ... |

1011  1012  1013  1014

BatchLexValues 1021

| lexval | lexval-ext | id | canon-lexval | canon-lexval-ext | canon-id |
|---|---|---|---|---|---|
| <http://xyz.com/John> | | 100 | | | |
| <http://xyz.com/age> | | 300 | | | |
| "024"^^<http://www.w3.org/2001/XMLSchema#decimal> | | 200 | "24"^^<http://www.w3.org/2001/XMLSchema#decimal> | | 400 |
| ... | | ... | ... | | ... |

1032 1033 1034 1035 1036 1037

1041 1042 1043 1044

BatchIdTriples 1051

| model-id | subj-id | pred-id | canon-obj-id | obj-id |
|---|---|---|---|---|
| 1 | 100 | 300 | 400 | 200 |
| ... | ... | ... | ... | ... |

1052 1053 1054 1056 1055

1057

AllCollExt 1061

| lexval | collision-ext | canon-collision-ext |
|---|---|---|
| <http://xyz.com/Joan> | 500 | |
| ... | ... | ... |

1071 1072 1073

1075

Local Tables

Figure 10

Bulk Load

Bulk Load

Hash Collision Detection and Resolution / Bulk Loading

Examples of RDF triples with same object and predicate

1611

```
DEFINE vname_expr = lex_value
```

1601

1621

```
        prefix_val =
            WHEN length(vname_expr) <= MAX_SUFFIX_LEN
1622    {   THEN
                NVL(substr(vname_expr,
                           1,
                           Instr (translate(vname_expr,'/#','::')
1623                              ,':',
                                  -1
                                  )
                           ),                                   1625
1624        {   vname_expr
                )
1626    {   ELSE  substr(vname_expr,1, length(vname_expr)-MAX_SUFFIX_LEN-1)
                ||
                NVL(substr(substr(vname_expr,
                           length(vname_expr)-MAX_SUFFIX_LEN),
                           1,
                           instr (translate(substr(vname_expr,
                                                   length(vname_expr)-
                                                   MAX_SUFFIX_LEN),
1627                                        '/#',
                                            '::'
                                            ),
                                  ':',
                                  -1
                                  )
                           ),
1628    {       substr(vname_expr,length(vname_expr)-MAX_SUFFIX_LEN)
                )
```

1602

1631

```
        suffix = substr(lex_value,length(prefix_val)-1)
```

1603

Parsing URI values into prefix and suffix

Figure 16

Collecting the list of all collision resolutions

Canonicalization

Prior Art: Examples of RDF data format for bulk-load input

Processing Old Collisions

Processing New Collisions
local/global

Collecting List of New Collisions / Processing local only

REPRESENTING AND MANIPULATING RDF DATA IN A RELATIONAL DATABASE MANAGEMENT SYSTEM

CROSS-REFERENCE TO RELATED APPLICATIONS

The instant Application is a divisional application of U.S. application Ser. No. 12/188,927, which was filed on Aug. 8, 2008 and entitled "REPRESENTING AND MANIPULATING RDF DATA IN A RELATIONAL DATABASE MANAGEMENT SYSTEM" and is now U.S. Pat. No. 8,078,646. The content of this U.S. patent is hereby incorporated by reference in its entirety for all purposes. The subject matter of this patent application is related to the subject matter of US published patent application 2006/0235823, Eugene Inseok Chong, "Integrating RDF data into a relational database system", filed 18 Apr. 2005 and to the subject matter of U.S. Ser. No. 12/188,267, Zhe Wu, Database-based inference engine for EDFS/OWL constructs, filed on even date with the present patent application.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

Field of the Invention

The techniques disclosed herein relate to representing and manipulating RDF data in a large RDBMS. Particular techniques include efficient bulk loading of RDF data, using hash functions to generate the identifiers for the lexical values of the RDF data in the RDBMS, and techniques for compressing lexical values that are URIs.

Representing Information Using RDF

RDF is a widely-used language that was originally developed for representing information (metadata) about resources in the World Wide Web. It may, however, be used for representing information about absolutely anything. When information has been specified using the generic RDF format, it may be consumed automatically by a diverse set of applications.

There are two standard vocabularies defined on RDF: RDF Schema (RDFS) and the Web Ontology Language (OWL). These vocabularies introduce RDF terms that have special semantics in those vocabularies. For simplicity, in the rest of the document, our use of the term RDF will also implicitly include RDFS and OWL. For more information and for a specification of RDF, see RDF Vocabulary Description Language 1.0: RDF Schema, available at www.w3.org/TR/rdf-schema/

OWL Web Ontology Language Overview, available at www.w3.org/TR/owl-features/

Frank Manola and Eric Miller, RDF Primer, published by W3C and available in September, 2004 at www.w3.org/TR/rdf-primer/.

The RDF Vocabulary Description Language 1.0: RDF Schema, OWL Web Ontology Language Overview, and RDF Primer are hereby incorporated by reference into the present patent application.

Representation of Facts as RDF Triples

FIG. 1 and FIG. 2 provide an overview of RDF. Facts in RDF are represented by RDF triples. Each RDF triple represents a fact and is made up of three parts, a subject, a predicate (sometimes termed a property), and an object. For example, the fact represented by the English sentence "John is 24 years old" can be represented in RDF by the subject, predicate, object triple <'John', 'age', '24'>, with 'John' being the subject, 'age' being the predicate, and '24' being the object. In the following discussion, the values in RDF triples are termed lexical values. In current RDF, the values of predicates must ultimately resolve to lexical values termed universal resource identifiers (URIs), and the values of subjects must ultimately resolve to lexical values termed URIs and blank nodes.

The following are examples of URIs:
http://www.w3.org/2000/01/rdf-schema#Resource
http://www.w3.org/1999/02/22-rdf-syntax-ns#type
http://example.org/family/Female
http://www.w3.org/2000/01/rdf-schema#subClassOf
http://example.org/family/Person A URI is a standardized format for representing resources on the Internet, as described in RFD 2396: Uniform Resource Identifiers (URI): Generic Syntax, www.ietf.org/rfc/rfc2396.txt. RFD 2396 is hereby incorporated by reference into the present patent application. In the triples, the lexical values for the object parts may be literal values. In RDF, literal values are strings of characters, and can be either plain literals (such as * Immune Disorder*) or typed literals (such "2.4"^^xsd:decimal). The interpretations given to the lexical values in the members of the triple are determined by the application that is consuming it. For a complete description of RDF, see Frank Manola and Eric Miller, RDF Primer, published by W3C and available in September 2004 at www.w3.org/TR/rdf-primer/. The RDF Primer is hereby incorporated by reference into the present patent application.

Representing the RDF Triple as a Graph

RDF triples may be represented as a graph as shown at 109 in FIG. 1. The subject is represented by a node 103, the object by another node 107, and the predicate by arrow 104 connecting the subject node to the object node. A subject may of course be related to more than one object, as shown with regard to age 103. An example triple is shown at 117. In the following general discussion of RDF, lexical values that are URIs will be replaced by the names of the entities the URIs represent.

Note that for clarity in the various figures and descriptions, URIs such as :Reviewer and :Person are shown in a simplified format in which default namespaces are omitted: thus :Reviewer is shown simply as Reviewer, with the initial colon designating the default namespace omitted.

Making RDF Models Using RDF Graphs

An RDF representation of a set of facts is termed in the following an RDF model. A simple RDF model Reviewers is shown at 101 in FIG. 1. The model has two parts: RDF data 113 and RDF schema 111. RDF schema 111 is made up of RDF triples that provide the definitions needed to interpret the triples of RDF data 113. Schema triples define classes of entities and predicates that relate classes of entities. A definition for the predicate age is shown at 112. As shown there, a predicate definition consists of two RDF triples for which the predicate is the subject. One of the triples, which has the built-in rdfs:domain predicate, indicates what kind of entities must be subjects for the predicate. Here, it is entities belonging to the class Person. The other triple, which has the built-in rdfs:range predicate, indicates what kinds of entities must be objects of the predicate; here, it is values of an integer type called xsd:decimal. Schema 111 uses the rdfs:subClassOf predicate 110 to define a number of subclasses of entities belonging to the class Person. Also defined are Conference and University classes of entities, together with predicates that relate these entities to each other. Thus, an entity of class Person may be a chairperson of a conference and an entity of class Reviewer may be a reviewer for a conference.

Also belonging to Schema 111 but not shown there is the built-in RDF predicate rdf:type. This predicate defines the subject of a triple that includes the rdf:type predicate as an instance of the class indicated by the object. As will be explained in more detail, RDF rules determine logical relationships between classes. For example, a built-in RDF rule states that the rdfs:subClassof relationship is transitive: if A is a subclass of B and B a subclass of C, then A is a subclass of C. Thus, the class Faculty is a subclass of Person.

The data triples to which schema 111 applies are shown at 113; they have the general pattern <individual entity>, <predicate>, <object characterizing the individual entity>. Thus, triple 115 indicates that ICDE 2005 is an entity characterized as belonging to the class Conference and triple 117 indicates that John is characterized by having the age 24. Thus, RDF data 113 contains the following triples about John:

John has an age of 24;
John belongs to the subclass Ph.D.student;
John is a ReviewerOf ICDE 2005.

An RDF model is a set of assertions. Hence, as a set, it should not contain duplicate assertions, that is, all <subject, predicate, object> data triples should be unique, and not be repeated within a model. However, two distinct RDF models may contain some data triples that are the same in the two models. The requirement that data triples not be duplicated or repeated in an RDF model is referred to as the set property.

Inferencing in RDF Models

As is well known, an inferencing operation in RDF derives additional triples by applying RDF rules to the existing triples. These rules specify one or more triple patterns to be matched. If the patterns of the rule are matched, the output is a number of new triples. The rules used for inferencing may either be built in to RDF or particular to a model. In the latter case, the rules are specified with the model. The built-in RDF rule that the rdfs:subClassof predicate is transitive is an example of how a RDF rule can be used to infer new triples.

In FIG. 1, none of these triples states that John is a Person; however, the fact that he is a Person and a Reviewer is inferred from the fact that he is stated to be a Ph.D.student, which is defined in schema 111 as a subclass of both Person and Reviewer. Because the rdfs:subClassof predicate is transitive (by virtue of the built-in rule to that effect), the fact that John is a PhD Student means that he is a potential subject of the Age and ReviewerOf properties.

Using RDF Patterns to Query RDF Models

RDF models are queried by applying to an RDF model a set of RDF triples in which one or more subject and objects are replaced by variables. Such an RDF triple is termed an RDF pattern. As is well known, an RDF query (such as may be done using an RDF query language such as SPARQL) applies this set of query triples to the RDF model and returns the subgraphs that satisfy the query as a result. For a description of SPARQL, see SPARQL Query Language for RDF, W3C Working Draft, 12 Oct. 2004, found at http://www.w3.org/TR/2004/WD-rdf-sparql-query-20041012/.

For purposes of the present discussion RDF models are best represented as lists of RDF triples instead of graphs. FIG. 2 shows a table of triples 201 that lists triples making up schema 111 and a table of triples 203 that lists triples making up RDF data 113. At the bottom of FIG. 2 is an RDF pattern 205. There are many different ways of expressing RDF patterns; what follows is a typical example. When RDF pattern 205 is applied to RDF model 101, it will return a subgraph of RDF model 101 that includes all of the reviewers of conference papers who are PhD students. The pattern is made up of one or more patterns 207 for RDF triples followed by an optional filter that further restricts the RDF triples identified by the pattern. The identifiers beginning with the character "?" are variables that represent values in the triples belonging to the subgraph specified by the RDF pattern. Thus, the first pattern 207(1) specifies every Reviewer for every Conference indicated in the RDF data 203; the second pattern 207(2) specifies every Reviewer who belongs to the subclass Ph.D.student, and the third pattern 207(3) specifies every Person for which an age is specified. The result of the application of these three patterns to RDF data 203 is the intersection of the sets of persons specified by each of the patterns, that is, the intersection of the set of reviewers and the set of PhD Students of any age. The intersection is John, Tom, Gary, and Bob, who are indicated by the triples in data 203 as being both PhD students and reviewers.

Implementations of Systems for Querying RDF Models

A number of query languages have been developed for querying RDF models. Among them are:

RDQL, see RDQL—A Query Language for RDF, W3C Member Submission 9 Jan. 2004, http://www.w3.org/Submission/2004/SUBM-RDQL-20040109;

RDFQL, see RDFQL Database Command Reference, http://www.intellidimension.com/default.rsp?topic=/pages/rdfgateway/reference/db/default.rsp;

RQL, see G. Karvounarakis, S. Alexaki, V. Christophides, D. Plexousakis, M. Scholl. RQL: A Declarative Query Language for RDF. WWW2002, May 7-11, 2002, Honolulu, Hi., USA.

SPARQL, see SPARQL Query Language for RDF, W3C Working Draft, 12 Oct. 2004, http://www.w3.org/TR/2004/WD-rdf-sparql-query-20041012/.

SquishQL, see RDF Primer. W3C Recommendation, 10 Feb. 2004, http://www.w3.org/TR/rdf-primer.

The query languages described in the above references are declarative query languages with quite a few similarities to SQL, which is the query language used in standard relational database management systems. Indeed, systems using these query languages are typically implemented on top of relational database systems. However, because these systems are not standard relational database systems, they cannot take advantage of the decades of engineering that have been invested and continue to be invested in the standard relational database systems. Examples of the fruits of this engineering that are available in standard relational database systems are automatic optimization, powerful indexing mechanisms, facilities for the creation and automatic maintenance of materialized views and of indexes, and the automatic use of available materialized views and indexes by the optimizer.

US Published Patent Application 2006/0235823 A1 describes how an RDF querying system may be integrated into an RDBMS: for convenience, this will be referred to as the 2006/0235823 reference. An additional relevant prior art reference is the Oracle Database release 10G: for convenience, this will be referred to as the Oracle 10G reference (see: Oracle Database Documentation Library, http://download.oracle.com/docs/cd/B14117_01/index.htm).

Overview of an RDBMS into which RDF has been Integrated

The systems of the 2006/0235823 and Oracle 10G prior art references, and the system of this invention, are implemented in an RDBMS. FIG. 4 is a functional block diagram of a relational database management system 401 into which RDF has been integrated. RDBMS systems are characterized by the fact that the information they contain is organized into tables having rows and named columns. A row of data establishes a relationship between the items of data in the row and the SQL query language uses the relationships thus established to locate information in the tables. RDRMS system 401 may be any RDBMS in which RDF queries have been integrated into the SQL used in the RDBMS. In RDBMS 401, a built-in table function has been used to integrate the RDF queries into the SQL.

The main components of RDBMS system 401 are a processor 421, memory 403, which contains data and programs accessible to the processor, and persistent storage 423, which contains the information organized by system 401. Processor 421 further can provide information to and receive information from display and input devices 422, can provide information to and receive information from networks 424, and can provide information to and receive information from file system 426. Processor 421 creates RDBMS system 401 as the processor 421 executes programs in memory 403 using data contained in memory. The programs typically include an operating system 407, which manages the resources used by RDBMS 401, relational database program 409, which interprets the SQL language, and application programs 411, which provide queries to RDB program 409. Data used by these programs includes operating system data 419, used by the operating system RDBMS data 417, used by RDB program 409, and application program data 415, used by application programs 411.

The information that RDB program 409 maintains in persistent storage 423 is stored as objects that RDBMS system 401 is able to manipulate. Among the objects are fields, rows, and columns in the tables, the tables themselves, indexes to the tables, and functions written in the SQL language. The objects fall into two broad classes: user-defined objects 441, which are defined by users of the RDBMS, and system-defined objects 425, which are defined by the system. RDBMS 401 maintains definitions of all of the objects in the database system in data dictionary 427, which is part of DB system objects 425. For the present discussion, the most important definitions in data dictionary 427 are table definitions 429, which include definitions 431 of RDF tables 443, table function definitions 433, which define table functions including RDF_MATCH table function 435, which permits use of RDF patterns to query RDF models in RDBMS 401, and SQL function definitions 437, which includes RDF-_GENMODEL function 439, which takes RDF triples and makes them into RDF tables 443.

The tables of interest in user objects 441 are RDF tables 443, which are tables in RDBMS 401 that are typically made from character-string representations of RDF models and their triples. The character-string representations are typically contained in files. Tables 443 fall into three groups: RDF triple tables 445, which represent the triples making up an RDF model 101, RDF rule tables 449, which contain the rule bases belonging to RDF information 313, and RDF optimization objects 447, which are tables and other objects which are used to speed up queries on the RDF models represented by RDF triple tables 445 and the RDF rules in rules tables 449. All of these tables and objects will be explained in more detail below.

Representations of RDF Triples

The 2006/0235823 reference discloses a normalized representation for RDF triples. The tables used to represent RDF triples are shown in detail in FIG. 6. There are two main tables: IdTriples 601, which is a list of models and their RDF triples, as represented by internal identifiers for lexical values of the triple, and UriMap 613, which maps each distinct lexical value to a distinct internal identifier and thus permits conversions between the URIs and literals and the internal identifiers. The internal identifiers are typically integers or other values having datatypes native to the database management system.

The relationship established between each distinct value in one set, to a distinct value in another set, as just described between the lexical values and unique internal identifiers, termed in the following UIDs, is referred to as a mapping between the first set and the second set. The mapping between the lexical values and the UIDs is also one-to-one: for each distinct lexical value, there is one particular UID, and for each UID, there is one distinct lexical value. Further, the mapping is bi-directional: for any given UID, it is always possible to know what the corresponding lexical value is, and vice versa. These properties of the mapping allow the UID to be used to "stand in" for the lexical value, and is an important technique used in RDBMS systems.

The process of mapping lexical values to UIDs is termed normalization, and a table like the IdTriples table 601 containing UIDs for the lexical values of RDF triples, with a second table like the UriMap table 613 mapping the UID values to the lexical values, is a normalized representation of a set of RDF models. Each distinct lexical value in the RDF triples belonging to the set of models in IdTriples table 601 must have a UID mapped to it in RDBMS 401. A table such as IdTriples table 601, in which the lexical values in the triples are represented by their UIDs, is said to contain normalized forms of the RDF triples. Advantages of normalization include the following:

1. URIs of RDF data tend to be large and are usually repeated many times in the data of an RDF model. Storing them as they are (typically as Strings) would be wasteful in storage, thereby making the table and dependent indices unnecessarily large and hence resulting in lower performance. Integer UID values generally require substantially less storage space than do strings: use of integer UID values instead of the original strings in the IdTriples table thus saves substantially on storage space. The reduction in storage space for the table and dependent indices further leads to performance improvements, such as by allowing more of the table and dependent indices to fit into available main memory for processing.
2. String comparisons are further much less efficient than integer comparisons. For this reason, operations such as tests for equality (sameness) of one triple to another, or queries to locate triples that have a particular value in them, execute more quickly if they are performed using the UIDs that represent the lexical values in the triples rather than the lexical values themselves.

In the prior art, the UIDs used for normalization are typically generated by the RDBMS. Generally, the RDBMS produces sequential values for the UIDs: 1, 2, 3, 4, etc., and maps these sequential values to the distinct lexical values. Because each value in the sequence of generated values is different from the others, a UID represents each distinct lexical. One limitation of such a scheme is that UID values must be generated serially, and must be generated by a single register, which precludes the possibility of generating UID values concurrently or on multiple systems for improved performance. The mechanism for getting the UID value for a particular lexical value, is to store each pair of lexical value with UID value in a table as each UID value is generated and related to the lexical value, and then to look up the lexical value in the table when the UID is needed. One limitation of this technique is the time required to look up the UIDs, especially when the resulting table becomes large.

RDBMS JOIN Operations and their Use with Mapping Tables:

An important functionality in RDBMS systems is the JOIN operation. The JOIN operation is used as an optimization and programming convenience, to combine two tables into a temporary or simulated table, when the two tables both contain common columns that refer to the same values. JOIN operations are frequently used to combine a mapping table, such as the URIMap table 613, with a table that has been created to take advantage of the mapping, such as the IdTriples table 601. The common columns in this case are the InternalId column 615 of the URIMap table 613, and the SubjectId 605, PropertyId 607, and ObjectId 609 columns of the IdTriples table 601. A JOIN operation performs the necessary lookup operations to combine the two tables. For example, a JOIN operation could be performed on the URIMap 613 mapping table, for each of the three columns in the IdTriples table 601, to produce a temporary or virtual table that appeared to have the full strings for Subject, Object, and Predicate, rather than the UID values of the IdTriples table 601.

JOIN operations in an RDBMS operation simplify the design and programming of many applications, and generally result in less storage space being used, because it is not necessary to repeat data in several different permanent tablet. JOIN operations are also often more efficient than creating an actual table like the temporary or virtual table of the JOIN. JOIN operations are also a convenient way to establish and exploit relationships among several tables.

For further information about JOIN operations, see
Oracle® Database SQL Language Reference, 11g Release 1 (11.1), Joins, download.oracle.com/docs/cd/B28359_01/server.111/b28286/queries 006.htm
Join(SQL), en.wikipedia.org/wiki/Join_(SQL)

Using Hashing to Generate UIDs

Some systems for storing RDF data in an RDBMS use the technique of assigning a UID that is mathematically derived from the input data value alone.

The most common form of this technique is to derive the UID values for normalization mathematically using a hashing function, also referred to just as a hash function. For the purposes of this presentation, a hash function is a function or operation that takes a value as an input, and generates another value as an output.
always produces an output value for every valid input value.
for a given input value, always generates the same output value.
... and thus maps its input values to its output values. Such a mapping operation with a hash function is also referred to as hashing.

Hash functions as described here are widely used to speed up table lookup in data processing systems. The data value is referred to as the hashed value—the input to the hashing function—and the output of the function for a particular hashed value is referred to as the hash value. Many well-known hash function produce output values that are integers, or are a set of bits of a particular length such as 128 bits, or a set of bytes of a particular length such as two bytes or characters.

However, hash functions generally do not always generate unique values: a case where two different values that are hashed by the hash function result in the same hash value is known as a hash collision. The technique of computing a different hash value by re-doing the hash with modified input data or an equivalent operation, for one of the hashed values in a collision, so that the resulting hash values no longer collide, is generally referred to as hash collision resolution.

Prior art systems that use hashing functions to generate UIDs for normalization from lexical values
in RDF triples are unable to resolve hash collisions. When a collision occurs, these prior art systems do one or more of the following:
Reject the data that resulted in a hash collision:
in this case, the system cannot handle all input data.
Require that the input data be modified so that no collision occurs:
in this case, the system is no longer a system that answers queries or does processing about the actual input data.
Disregard the probability that hash collisions may occur:
in this case, the system fails to operate correctly when a hash collision does occur.

None of these alternatives is acceptable in a production system for manipulating RDF models. An example of a prior art system which uses hashing for normalization but does not resolve collisions is 3Store: (see "3store: Efficient Bulk RDF Storage", 1st International Workshop on Practical and Scalable Semantic Systems, Oct. 3, 2003, Sanibel Island, Fla., km.aifb.uni-karlsruhe.de/ws/psss03/proceedings/harris-et-al.pdf).

Details of IdTriples Table 601

Continuing in detail with IdTriples table 601, this table has a row 611 for every RDF triple in the RDF models that have been loaded into RDBMS. The table has four columns:
ModeID 603,
which contains the internal identifier of the model to which the RDF triple belongs;
SubjectID 605,
which contains the UID for the RDF triple's subject;
PropertyID 607,
which contains the UID for the RDF triple's predicate; and
ObjectID 609,
which contains the UID of the RDF triple's object.

As shown in FIG. 6, IdTriples table 601 shows the rows for the first four data triples of data triples 203. It would of course contain a row for every schema triple in table 201 and every data triple in table 203.

The IdTriples table is partitioned in the RDBMS on ModelId with each partition holding a separate RDF graph or model. This maintains locality of each model within the table. The rows for the model Reviewers are illustrated at 631. Further, the rows for a separate model Farmers are illustrated at 633.

In a typical RDBMS, when a table is a partitioned table, the different partitions of a table may be indexed, modified, and updated separately from each other. An operation of particular interest in the system of the Oracle 10G reference, is the EXCHANGE PARTITION operation that allows an entire partition of a table to be updated in a "zero cost" operation—that is, an operation in the RDBMS which does not involve moving or copying significant amounts of data. The operation changes the internal definition of the table so that a particular partition of the table now refers to a separate part of the RDBMS storage that is already prepared with appropriate data. Depending on the implementation in the particular DBMS, the different partitions of the table may be stored in different groups of blocks on disk, in separate files, in separate directories of a filesystem, or on physically separate filesystems or data servers. Techniques for supporting partitioned tables within an RDBMS are well known in the art.

As an example, a possible partitioning of a database table involving ZIP codes would be to partition the data into two separate sections, one named ZIPEAST for rows for ZIP codes less 50000, and another ZIPWEST for rows for ZIP codes greater than or equal to 50000.

Partitioning the IdTriples table 601 in the RDBMS brings advantages such as the following:

A given RDF model may be updated, have its index rebuilt or disabled, or modified in other ways without affecting the data of other models.

Indices can be defined for a table but categorized as local, and thus maintained separately for each partition, resulting in more efficient performance and smaller indices in each partition. Further, compression features of the RDBMS allow the model column to be substantially compressed and use less storage space.

Inserting a row in one RDF model does not affect or involve the storage or indices of other models.

It is easier to set and enforce access control on a per-model basis.

A uniqueness constraint in the RDBMS is defined on the (SubjectID, PropertyID, and ObjectID, ModelId) columns in the IdTriples table to ensure that no duplicate triples can be inserted into a model in error. Because the table is partitioned on ModelId, this constraint is enforced by an index categorized as local, which results in separate index storage for each partition. The separate index storage on the model/partition Reviewers Id 631 is shown at 635, applying to the three columns SubjectID 605, PropertyId 607, and ObjectId 609. The separate index storage on the model/partition FarmersId 633 is shown at 637, and applies to the same columns, but within the FarmersId model/partition only.

Uniqueness constraints are defined on a table in an RDBMS such as Oracle by the CREATE UNIQUE INDEX operation. For further information on indices and constraints, see Oracle® Database SQL Reference 10g Release 1 (10.1), download.oracle.com/docs/cd/B14117_01/server.101/b10759.pdf.

UriMap table 613 has a single row 619 for every UID that appears in IdTriples table 601. There are four columns that are of interest in the present context:

InternalID 615, which contains the UID; and

RDFVal 617, which specifies a lexical value corresponding to the UID;

A flag that indicates for an RDFval 617 whether it is a literal value whether the value is in the canonical form;

The type of RDFVal 617.

Uniqueness constraints in the RDBMS are defined on the InternalID 615 and RDFVal 617 columns respectively in the UriMap table, to ensure that all InternalID values and also all RDFVal values are distinct. The uniqueness index and constraint on InternalID 615 is shown at 641. The uniqueness index and constraint on RDFVal 617 is shown at 642.

The canonical form for a literal value is a standard form for writing the value. For example, the numeric value 24 may be written as 024, 24.00, $2.4\times10^1$, and so on. Depending on the application, any of these may be used as the canonical form, or a different form may be used as the canonical form. Canonicalization is the technique of translating different formats for the same information value to the standard form. In the 2006/0235823 reference, the form used for the value when the first entry is made for the value in UriMap 613 is treated as the canonical value. There is further an index, idx_num 627, which indexes a given numerical value to a row in UriMap 613 that contains the canonical representation Ancillary Application Tables The Oracle 10G reference also describes ancillary application tables. These ancillary application tables are permodel: a particular such application table only contains information relevant to a particular RDF model.

An application may involve additional information about RDF triples from a particular model that are not part of the RDF model. Depending on the application, this additional information may be included in the input data for the RDF model, or it may be input separately. For example, there may be information associated with the RDF triple giving the provenance of that triple, such as which organization or individual input that particular triple into the dataset. FIG. 8 illustrates an exemplary application table 801.

The application table 801 contains three initial columns: column ID shown at 812 holds an internal sequentially-generated UID value for each row of the application table 801, virtual column SDO_RDF_TRIPLE_S at 813 holds a data object which contains five values. The first of these values model_id,a,b,c consists of the ModelId identifier, SubjectId, PropertyId, and ObjectId UID values corresponding to the model, subject, predicate, and original object strings of the RDF triple. The additional link_id value is an identifier for the row in the model's partition in the IdTriples table 601 that holds the normalized form of the RDF triple—this normalized triple contains the UID of the canonical form of the original object of the triple, and not the UID of the original object string. Together, the model_id and link_id values could be used for the functionality of a foreign key from the application table into the IdTriples table.

Columns 814 source_db and further columns 815, etc. contain the additional information associated with that original RDF triple. The row at 811 shows example values for a triple (model-id, a,b,c, link_id) showing that this particular RDF triple in this particular model came from a source identified as SourceDB23.

Fidelity

An additional requirement of RDF databases is that the implementation not only translate input values to a canonical form, but also that it maintain fidelity or data integrity to the original form of the values. Fidelity is the ability to reproduce the original lexical values or data exactly as it was in the original data. Fidelity can required for a number of reasons in different application, for example, it may be necessary to be able to verify the information in the RDF triples by comparing it with original data exactly, or it may be necessary to produce the original value in order to export data back to the original source.

Limitations of Prior Systems in which RDF is Integrated into an RDBMS

Experience with prior-art systems such as system 401 of FIG. 4 has shown that improvements are needed in dealing with collisions when UIDs are produced by hashing, in bulk loading of RDF data into the RDBMS, and the compression of URIs.

Generation and Use of UIDs

Real-world RDF datasets tend to be quite large. For example, the UniProt RDF model is a well-known RDF representation of the data from the Universal Protein Resource (UniProt) database about biological proteins and related annotation data (see UniProt Database, www.isb-sib.ch/~ejain/rdf). This model currently (2008) contains about 207 million triples, referencing some 33 million or more lexical values, constituting approximately 12 Gigabytes of data in the character string format used to distribute the model. Systems for manipulating and querying large real-world RDF datasets need to be able to operate on datasets of a billion (1,000,000,000) triples and more.

FIG. 5 gives a summary of prior art normalization for RDF Triples (subject, predicate, object). Normalized triples are stored in two tables, a LexValues (lexval, id) table 521 and an IdTriples (subj-id, pred-id, obj-id) table 501.

For the purposes of this presentation, IdTriples table 501 is equivalent to IdTriples table 601, and the LexValues table 521 is equivalent to UriMap table 613.

The LexValues table 521 has two columns, lexval 533 for the lexical value, and id 538 for the normalized UID to which that lexical value has been mapped. The row at 531 shows that the lexical value string "John" will be represented by the UID value 100. The IdTriples table 521 has three columns subj-id 505, pred-id 507, and obj-id 509 for the normalized UIDs for the subject, predicate, and object parts respectively of the RDF triples. The row at 511 shows a normalized triple to represent the RDF triple ("John", "managerOf", "Mary") with the three UID values 100, 300, and 200 respectively.

The conversion of a set RDF triples to an IdTriples table such as table 501 requires that first, the LexValues table be constructed to establish the relationship of each distinct lexical value lexval 533 to a distinct id value 538. Further, the RDF triples are processed to translate each of the three lexical strings in each triple to the corresponding UID value. This involves three separate lookups of values in the LexValues table (once for each string in the triple), times the number of triples to be processed.

There are two factors that make this unwieldy and slow for large RDF models. In the example of the UniProt RDF model, each look-up is into a table with over 33 million entries: performing this look-up is a substantial burden. RDBMS systems provide special indexing means for speeding up look-up operations into tables, but with very large tables this is still a time-consuming operation. Further, there will be about 621 million such look-ups. RDBMS systems provide special capabilities that are useful in doing the type of look-ups used in this normalization process, such as doing multiple RDBMS JOINs of an unnormalized RDF triples table with three copies of the Lexvalues table. However, at the size of real-world RDF models, such as the single UniProt model, even the use of joins results in very slow processing. Thus, the prior art does not scale to the sizes required for very large real-world RDF models. For a system that is intended to support multiple RDF models, it is even more the case that the prior art does not scale.

A further prior art technique for dealing with this problem is the use of HASH JOIN operations. However. HASH JOIN operations only perform well when the join table fits completely into available main memory. Given the immense size of real-world RDF models, this means that RDBMS systems with the amount of main memory required for satisfactory performance with real-world RDF data systems will be both rare and expensive. Thus, this prior art also does not scale for very large real-world RDF models.

Bulk Loading

Bulk loading is a well-understood functionality that is provided by database management systems for loading large amounts or batches of data into RDBMS tables from external files. Support for bulk loading of DBMS data is included in all almost all commercial DBMS systems.

Bulk loading consists generally of dropping indices on the tables to which data will be added, and importing the additional data directly into the relevant tables with minimal processing on the data, followed by re-indexing the data. Bulk loading as just described does not, however, work well for bulk loading of RDF data, as it does not deal with the need to transform the RDF triples by normalizing lexical values, compressing URIs, and generating canonical forms for literal values.

In the preferred embodiment, RDF data to be bulk-loaded is contained in files. In these files, the RDF data may be represented in a number of standard formats. One of these is the N-Triple format. FIG. 19 shows examples of the N-Triple format for RDF data. In this format, each element of this triple is enclosed in angle brackets and the elements have the order subject, predicate, and object. For further information on the N-Triple format, see N-Triples, www.w3.org/TR/rdf-testcases/#ntriples.

In N-Triple format, URIs and typed literals may employ delimiters within the value string: a delimiter is a character or specific sequence of characters that appear between two parts of the string, and thus delimit, or divide, the string into a first part and a second part. Unless specified otherwise, a delimiter can appear anywhere in the string: a delimiter which is at start of a string, for example, would "divide" the string into a second part, which is the rest of the string, and a first part, which would be nothing, also called an empty string. An internal delimiter is a delimiter which is not the first character or characters in the string, and also not the last character or characters of the string. The rearmost or final internal delimiter in a string would be the last such delimiter in the string, except for a delimiter which was at the end of the string. Another term for the first part of a string divided into two parts is the prefix, similarly a term for the second part of divided string is a suffix.

- 1904 shows a single triple representing that a Female is a subclass of the type Person. Each element of this triple is enclosed in angle brackets and the elements have the order subject 1942, predicate 1943, and object 1944. The object part of the triple is an example of an object value that is a URI, as shown at 1941.
- 1903 shows a triple representing that Tom was born at 8:10:56 P.M. on Dec. 10, 2004 (Greenwich Mean Time). The triple consists of the subject 1952, predicate 1953, and object 1954. The object part of the triple, shown at 1931 and 1932, is an example of a literal value in the typed literal format (see W3C RDF/XML Syntax Specification (Revised), www.w3.org/TR/rdf-syntax-grammar/): the value part of the typed literal string is at 1931, an internal delimiter consisting of two carets is at 1932, and the part of the string which states its type, including the strict syntax of the value part, is at 1933.
- 1902 shows a short except of another RDF file format based on XML: this example is excerpted from the UniProt database (see www.uniprot.org). The example 1902 states information about the location of a gene related to an organelle (a structure inside a cell) known as a chromatophore.
- 1901 shows three further examples of possible URI values, such as might be used in a triple in N-Triple format.

The need to make normalized and canonicalized forms of the RDF triples being loaded in bulk makes the problem of bulk-load for RDF data challenging. The challenges include:

- All input triples must be transformed and checked for conformance to the syntax and semantics of the standardized RDF format and data models.
- All lexical values must be normalized by mapping them to UIDs. This requires that the bulk load process further determine which lexical values being loaded already have been mapped to UIDs.
- Different representations in literal values of the same value in the input data must be translated reliably to a standardized and predictable canonical form, and further a UID must be assigned to the canonical form. This canonicalization requirement however is in tension with the need to preserve the original literal value, as required by the property of fidelity.

Duplicate triples within a model must be eliminated, in order to ensure the set property of the RDF data for the model. The set property requires that no triple exists more than once in the model.

There are further needs for reducing the storage required to hold the RDF data, as the datasets are quite large, and increased storage requirements result both in greater expense, and in reduced query performance.

Objects of the Invention

It is an object of the present patent application to provide improved techniques for using hash values as UIDs for instances of distinct data values.

It is an object of the present patent application to provide improved techniques for the bulk loading of RDF databases into an internal representation of the RDF databases in an RDBMS.

It is an object of the present patent application to provide improved techniques for the compression and storage of URIs in internal representations of RDF databases in an RDBMS.

BRIEF SUMMARY OF THE INVENTION

The object of providing improved techniques for the use of hash values as UIDs for instances of distinct data values is attained by a method of generating hash values for such instances. In the method, each distinct data value is mapped to hash value generation information which describes how to generate a unique hash value for instances of the distinct data value. The method comprises the step performed for an instance of a distinct data value of generating the hash value for the instance according to the hash value generation information to which the instance's distinct data value has been mapped.

The object of providing improved techniques for the bulk loading of an RDF database into an internal representation of RDF databases in an RDBMS is attained by a general method of making normalized representations of a batch of instances of data values such as RDF lexical values in the RDBMS. The method makes an entry for each distinct data value belonging to the instances of the distinct data values in the batch in a first mapping table in the relational database system. The entry contains the distinct data value and a normalized representation that is generated by hashing the distinct data value according to either a default hashing method or to a collision resolution hashing method, and a hash method indication that indicates the method used to hash the distinct data value. The method further generates a second mapping table by querying the first mapping table. The second mapping table includes entries for distinct data values whose hash method indications indicate that the distinct data values' normalized representations were made according to the collision resolution method. The method hashes each instance of data in the batch, doing so according to the default method unless the instance's distinct data value has an entry in the second mapping table.

The object of providing improved techniques for the compression and storage of URIs in representations of RDF databases in RDBMS systems is attained by a general method that may be employed with any data value that includes at least one internal delimiter. The steps of the method are parsing the data value to locate the delimiter, using the delimiter to divide the data value into a prefix and a suffix, and placing the prefix and the suffix into separate fields of an entry in an object in the relational database management system, the object being specified in the relational database management system as employing compression for the separate field containing the prefix.

Other objects and advantages will be apparent to those skilled in the arts to which the invention pertains upon perusal of the following Detailed Description and drawings, wherein:

BRIEF DESCRIPTION OF THE SEVERAL VIEWS OF THE DRAWINGS

FIG. 2 is an exemplary illustration of RDF triples making up an RDF schema and RDF data according to that schema.

FIG. 5 is an exemplary summary illustration of normalization of RDF triples of the prior art.

FIG. 8 is an exemplary illustration of ancillary application tables to store data about RDF triples that is not part of the RDF model.

FIG. 9 shows an API used in the preferred embodiment for creating tables used for bulk loading.

FIG. 10 shows RDBMS tables used locally for storing and processing data during bulk loading.

FIG. 16 shows a pseudo-code representation of the code to parse URI values into a prefix and a suffix.

DETAILED DESCRIPTION OF THE INVENTION

A presently-preferred embodiment of the techniques disclosed in the following Detailed Description is employed in a production system for implementing real-world RDF applications in an RDBMS like RDBMS 401.

RDBMS Tables for Storing RDF Models

Figure 7:
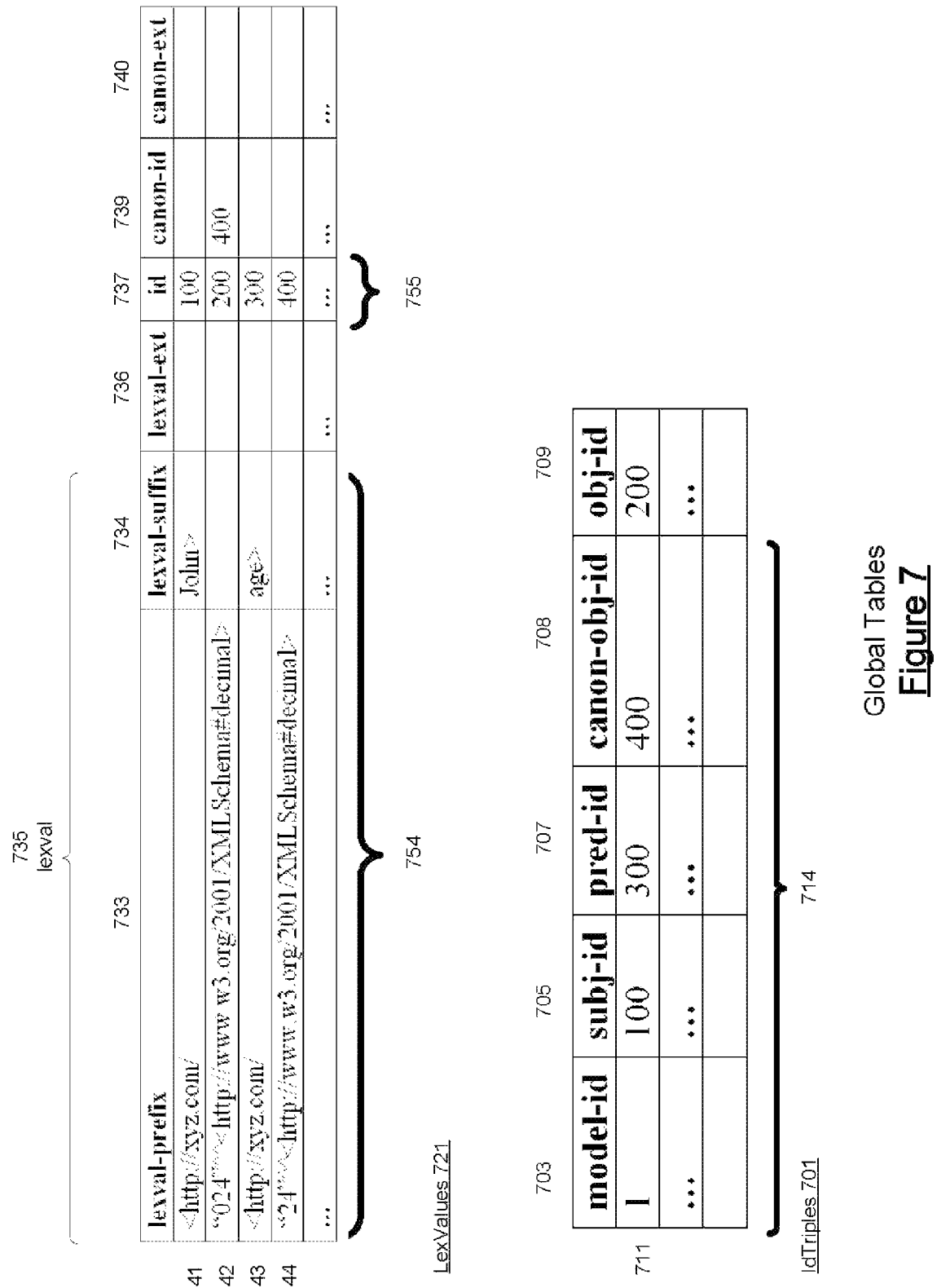
FIG. 7 shows RDBMS tables used globally for storing RDF triples in the preferred embodiment.

The tables used in the RDBMS for storing RDF data in a preferred embodiment are shown in FIG. 7. For clarity, a brief overview is given here. The tables are subsequently described in more Detail.

Overview of Tables for Storing RDF Models

There are two global tables used for storing RDF triples. In addition, there are four local tables used as working tables during bulk loading of RDF triples, referenced in FIG. 10.

Global tables:

LexValues:
  The entries in LexValues table 721 hold data for mapping lexical values to UIDs. This is done with two columns lexval and id. If the lexical value is a literal value that has a canonical form but is not in the canonical form, the entry also maps the literal value to its canonical form and then maps the canonical form to a UID and stores the UID in a column canon-id. In addition, the entry holds the additional input information needed for the hash function if either the id value and/or the canon-id value must be rehashed in two columns lexval-ext and canon-ext. A special feature is that the lexval column is a virtual column defined as a concatenation of two columns: the lexval-prefix column and the lexval-suffix column.

Note that for clarity, in the rest of this Detailed Description the name lexval for the virtual column, and the names lexval-prefix and lexval-suffix for the two columns thus described, may be used interchangeably except where they must be distinguished.

IdTriples:
  IdTriples table 701 holds the normalized representation for the RDF triples.
  There are three columns holding the UID values: subj-id, pred-id, and obj-id. Further, the column canon-obj-id holds the UID for the canonical form of the literal value if the object value is a typed literal. In addition, there is a column model-id that identifies which RDF model this triple is in: the table is partitioned with separate partitions for each model-id value.

Local tables:

StagingTable:
  StagingTable 1001 is a working table to hold all RDF triples being bulk-loaded.
    There are three columns subj, pred, and obj for the lexical values of the subject, predicate, and object of each RDF triple being bulk loaded. Reading all the RDF triples first into this working table, allows the system to operate on the data using powerful features of the RDBMS.

BatchLexValues:
  BatchLexValues table 1021 holds the mapping of lexical values to UIDs, before they are merged into the LexValues table.
    The lexval and id columns hold the lexical values and their corresponding UIDs. In addition, if the lexical value is a literal that is different from its canonical form, then the canon-lexval and canon-id columns hold the canonical form and the UID for the canonical form of the lexical value, respectively. All processing for collisions, collision resolutions; and canonicalization are done before the BatchLexValues data are merged into the LexValues table. Each row also holds the additional input information required for the hash function if either the id value and/or the canon-id value must be rehashed, in two columns lexval-ext and canon-ext.

BatchIdTriples:
  BatchIdTriples table 1051 holds the normalized representation of the RDF triples from StagingTable 1001 before they are merged into the IdTriples table. The BatchIdTriples table has the same structure as the IdTriples table, but is not partitioned: it holds triples only for a single model.
    One column holds the model-id identifier value for the triples being bulk-loaded.
    There are four columns holding the UID values: subj-id, pred-id, canon-obj-id and obj-id.

AllCollExt:
  AllCollExt table 1061 holds a list of every lexical value in Lexvalues table 721 whose UID was rehashed, or for whom the UID of the canonical value was rehashed.
    There are three columns: lexval for the lexical value, plus the columns collision-ext and canon-collision-ext for the extension values to be combined with the lexical or the canonical form of the lexical value respectively to produce the UID for the lexical value or its canonical form.

LexValues Table

FIG. 7 shows the LexValues table at 721. Each entry of this table relates one of the distinct lexical values in the set of RDF models represented by the IdTriples table 701 to the UID that represents the lexical value in the IdTriples table. In the preferred embodiment of the IdTriples table, the UIDs are produced by hashing the lexical values, and as will be explained in detail in the following, each entry contains not only the UID, but also a description of how the lexical value was hashed to produce the UID.

741 shows a representative row that contains a lexical value that is a URI, namely <http://xyz.com/John> in column lexval 735, and the corresponding UID value 100 in column id 737. Note that the lexval column at 735 is a virtual column computed by concatenating the lexval-prefix column 733, holding for example <http://xyz.com/, and the lexval-suffix column 734, holding for example John>. Breaking the lexical values that are URIs into a prefix and a suffix exploits special properties of RDF URI format, and allows the preferred embodiment to use table and index compression features of the RDBMS, as is explained below. A similar such representative row is shown at 743.

An RDBMS can enforce a uniqueness constraint using a unique index on a column or a set of columns together in a table. A unique index is an internal structure in the RDBMS, used to enforce, or guarantee, that the table contains no two values in that column, or no two sets of values in that set of columns, that are the same—that is, all the values in that column are unique, or distinct from each other. Further information on uniqueness constraints and indices can be found in:
  Oracle® Database Concepts 10g Release 1 (10.1), download.oracle.com/docs/cd/B14117_01/server.101/b10743/schema.htm.

Uniqueness constraint indices are defined for the LexValues table 721 on the combined (lexval-prefix, lexval-suffix) pair of columns as shown at 754, and on the id column as shown at 755. These RDBMS uniqueness constraints ensure that all lexval 735 values are distinct, and that all id 737 values are distinct.

The system of the preferred embodiment determines and stores canonicalized forms for literal lexical values that are not in canonical form. In the case where the literal value in StagingTable has a non-canonical form, there are rows in LexValues for both the non-canonical form of the literal value and the canonical form of the literal value. In the LexValues row for the non-canonical form, the field canon-id 739 is set to the value of id in the LexValues row where the canonical value is the value of the lexval field 735. For example, row 742 is the row for the original lexical value "024"^^<http://www.w3.org/2001/
XMLSchema#decimal>.

In row 742 the id value of 400 for row 744—the row for the canonical form of the lexical value—is stored in the column canon-id 739. In rows other than those for lexval values that are non-canonical forms of canonicalized literal values, canon-id is set to NULL.

The description of how the entry's lexical value was hashed is contained in a preferred embodiment in the column lexval-ext 736. If the column has the value NULL, the default hash function was applied to the lexical value and no collision resulted. If lexval-ext's value is non-NULL, the field's value is a value that was combined with the entry's literal value and then hashed to produce a non-colliding hash value. In a preferred embodiment, the value in lexval-ext is the colliding hash value. This permits repeated collisions: on each collision, lexval-ext is set to the colliding value. The process continues until a non-colliding hash value is generated. Column canon-ext 740 describes how the canonical form of the literal value is hashed in the LexValues row for the canonical form.

Variations on the above technique may be employed with other techniques for rehashing or producing a non-colliding value. For example, one way of doing rehashing would be to rehash the lexical value with a different hash function. In that case, a field in the entry could contain an indicator value for the hash function used to generate the value in id 737.

IdTriples Table

FIG. 7 shows the IdTriples table 701 of the preferred embodiment. The rows of this table contain normalized representations of all the RDF triples in a set of RDF models.

711 shows a representative row with the UIDs for the triple
(<http://xyz.com/John>, <http://xyz.com/age>,
"024"^^<http://www.w3.org/2001/
XMLSchema#decimal>), which states the (subject, predicate, object) relationship that John is 24 years old. In this example, the canonical form for the literal value "024"^^<http://www.w3.org/2001/
XMLSchema#decimal> is

"24"^^<http://www.w3.org/2001/
XMLSchema#decimal>.

The column model-id at 703 contains a unique identifier for the RDF model to which the triple represented by the row belongs. Columns subj-id at 705, pred-id at 707, and obj-id at 709 contain the UIDs 100, 300 and 200 respectively: these are the normalized UIDs for the lexical values in the triple represented by the row. Column canon-obj-id 708 holds the UID for the canonicalized literal value from column canon-id 739, and column obj-id 709 holds the id value for the original literal value from column id at 737. In the preferred embodiment, these UIDs are produced by hashing the triple's lexical values, as will be set forth below.

Storing the UID for the canonical form of the object value is done to support the requirement for value equivalence. Storing the UID for the original object value is done to support the requirement to maintain fidelity.

Figure 6:
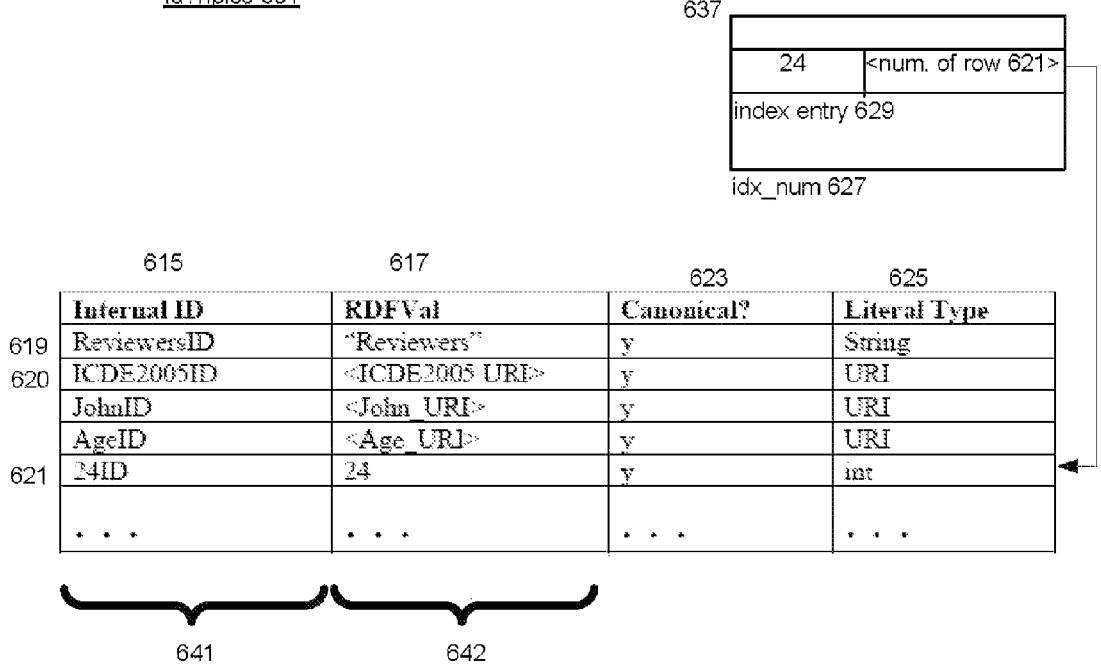
FIG. 6 shows the normalization of RDF triples in the prior art 2006/0235823 reference.

Like its equivalent in FIG. 6, the IdTriples table of FIG. 7 is partitioned in the RDBMS on model-id with each partition holding a separate graph or model. Special use of the partitioning is made during bulk loading, as is described below.

A uniqueness constraint 714 in the RDBMS is defined on the combined (pred-id, canon-obj-id, subj-id, model-id) columns in the IdTriples table to ensure that no duplicate triples can be inserted into a model/partition in error. Because the table is partitioned on model-id, this constraint is enforced by a separate index on the same list of columns for each partition.

Using Hashing to Generate UIDs

In the preferred embodiment, UIDs are generated by hashing lexical values. Collisions are fully resolved, so that there is a distinct UID value corresponding to each distinct lexical value. Special care is taken for rare colliding values.

UIDs created by hashing depend only on the value being hashed and the hash function. A given value hashed with a given hash function always produces the same hash value. It is this property that makes it possible to hash the lexical values to produce the UIDs for the IdTriples table. Deriving the UID for a given lexical value is a calculation, and does not require a look-up operation into a table of lexical values and their associated UIDs. This leads to several advantages for UIDs made by hashing, over UIDs that are not produced mathematically by calculation. These include:

Scalability to large datasets:
In the prior art, the conversion of the lexical values in the StagingTable table to the UIDs that represent the lexical values in the IdTriples table has been done by means of multiple joins between the StagingTable table and the LexValues table. For large real-world RDF datasets, both the LexValues mapping table and the StagingTable table become very large, on the order of a billion (1,000,000,000) records, and hence the need for multiple joins results in significant degradation of performance. As just set forth, if the UIDs for the lexical values are produced by hashing, there is no need for the joins.

System-independent UID generation:
If the hash function and value used to generate a UID for a lexical value are known, the UID can always be regenerated, regardless of the system in which the UID is generated. They further have no dependence on the order in which values are encountered. These properties permit generation of UIDs in bulk, concurrently, or in a distributed fashion. It also renders hash-based UIDs transportable between systems. The occurrence of collisions has limited the ability to exploit the advantages provided by hash-based schemes.

However, techniques disclosed herein overcome these limitations of hash-based schemes and make it possible to obtain the advantages.

Details of Hashing in a Preferred Embodiment
Selection of Hash Function to Minimize Collisions It is desirable to use a hash function that results in very few collisions. The selection of the hash function is a matter of design choice and may be made based on knowledge of the application, which hashing functions are available as built-in functions of the underlying RDBMS, the characteristics of the application dataset, or other considerations. The hash function used in the presently-preferred embodiment is Lookup, described in B. Jenkins, "A hash function for hash table lookup" *Dr. Dobb's Journal*, September 1997. Factors relevant to the selection of a good hash algorithm are: hash size, computational cost and collision rate. It is generally desirable to use a hash algorithm that is has an optimal balance of being efficient, producing a small size hash value, and being close to collision free.

Other well-known hash functions include the following:
SHA1: D. Eastlake and P. Jones. "US Secure Hash Algorithm 1 (SHA1)", IETF RFC 3174, September 2001.
MD5: R. Rivest. "The MD5 message-digest algorithm", IETF RFC 1321, April 1992.

MD4: R. Rivest, "The MD4 Message-Digest Algorithm", IETF RFC 1320, April 1992.

MD5 and SHA1 are almost collision free but produce long hash values of sizes of 128 bits and 160 bits respectively. Note that because both the MD5 and SHA1 functions cover their value space uniformly, it is feasible in program code to truncate their hash values to 48 or 64 bits, for better storage and query execution speed. If the hash values are truncated, collisions become more likely. The Lookup hash function on the other hand directly produces shorter hash values that are both storage and query execution friendly.

For the preferred embodiment, the 63-bit version of Lookup (built into the kernel of the Oracle RDBMS as a native function) is used: the choice was based on considerations of the speed and the hash quality as determined by experiment, and on hash id size.

Details of Hash Collision Resolution

The following principles are followed in generating hash-based UIDs in the preferred embodiment:
- There must be no collisions between hash-based UIDs contained in the LexValues table.
- When an entry for a new lexical value is to be added to the LexValues table and a collision results, the collision is resolved by rehashing the newly-added lexical value. Collisions may not be resolved by rehashing lexical values that are already in the LexValues table.

A result of these two principles is that any hash collisions must be resolved before a UID is added to the LexValues table.

For clarity, the techniques employed to detect and resolve hash collisions in an RDBMS are first described for a single lexical value for which an entry is being added to the Lexvalues table. Subsequently, techniques will be described for adding entries for many new lexical values to the LexValues table in a single operation.

Hashing when a Single Entry is being Added to LexValues Table 721

Figure 11:
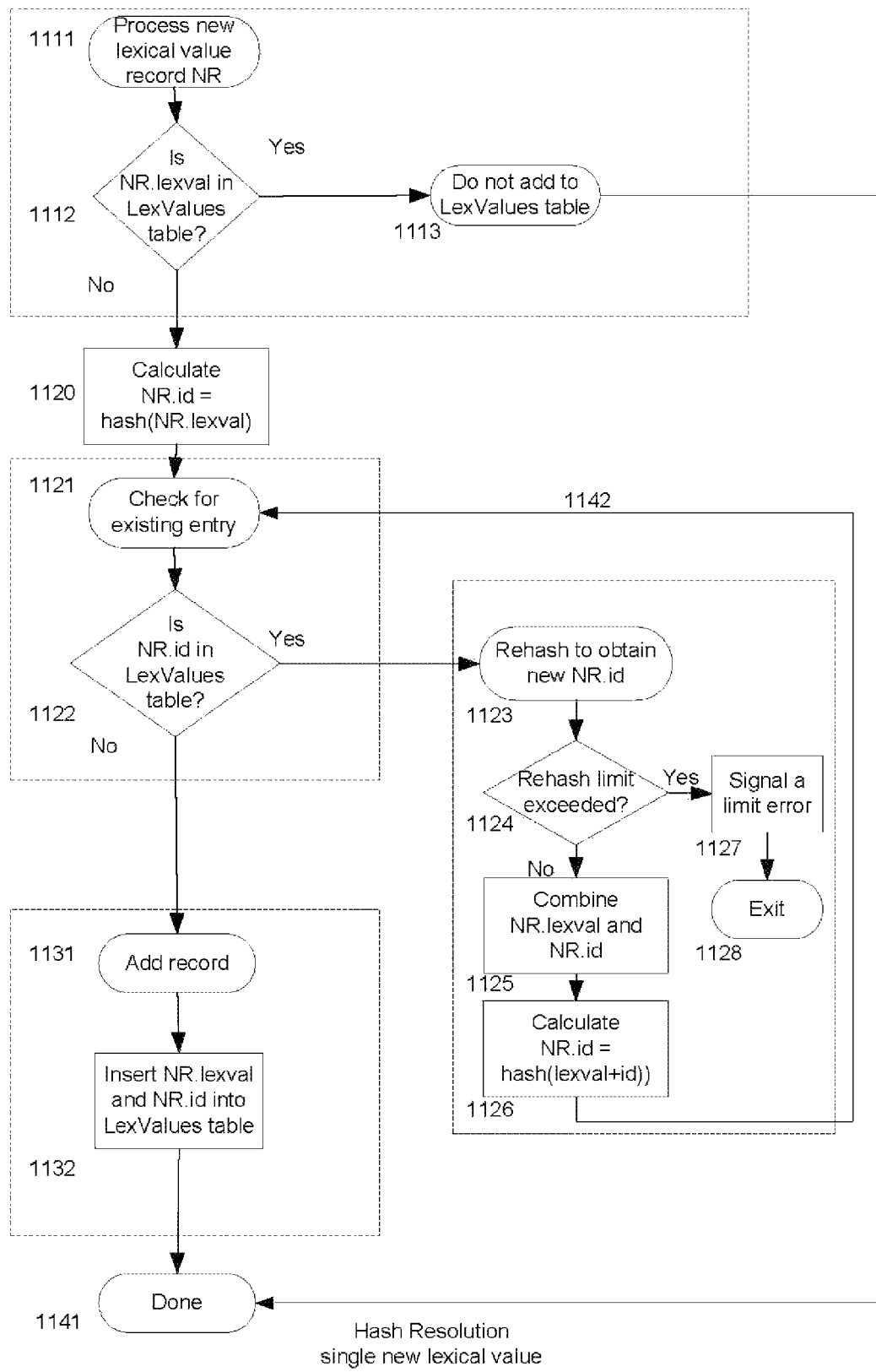
FIG. 11 shows a flowchart for creation, collision-detection, and collision-resolution of hash-based UIDs in the preferred embodiment when hash-based UIDs are mapped one-at-a-time to lexical values.

The steps of adding a single new entry to LexValues table 721 are shown in the flowchart of FIG. 11.

1111 shows the start of the process for adding a new value to the LexValues table. For clarity, the new lexical value and the corresponding UID value are referred to as NR.lexval and NR.id respectively: NR is an abbreviation for "new record", as the result of this process may be that a new record is added to the LexValues table.

1112 shows the first step of checking whether the new lexical value is already in the LexValues table. This test can be performed quickly by an SQL query. If the value is already in the LexValues table, then it already has been assigned a UID value in the LexValues table, and thus no new record should be added to the LexValues table, as shown at 1113, and the process is complete.

If the NR.lexval value is not in the LexValues table, then a hash value NR.id for the UID is calculated as shown at 1120 by executing the hash function with the NR.lexval value as the input to the hash function.

Before the new record of NR.lexval and NR.id can be added to the LexValues table, it is necessary to check for a hash collision, and to resolve any hash collision. These steps start at the section noted at 1121.

1122 shows the test for checking whether the NR.id value is already in use in any entry in the LexValues table. This test is performed quickly by an SQL query. If the NR.id value is already present in the id column of any row in the LexValues table, then a new hash value must be obtained by rehashing to resolve the collision, as described at 1123. As shown by loop 1142, a rehashing may result in another collision, which then requires another rehashing. Given the rarity of collisions, more than a few iterations of loop 1142 indicates some kind of malfunction.

The test at 1124 checks whether too many iterations of loop 1142 have occurred. If so, the process of adding an entry to LexValues table 721 terminates (1124, 1127, 1128). In the preferred embodiment, only 5 iterations of loop 1142 are permitted.

If the result of the step at 1122 is that the NR.id value does not result in a collision with a UID value already in use in the LexValues table, then the new record is added or inserted into the LexValues table as shown at 1131. 1132 illustrates that this is done quickly with an SQL insert operation. In the new record, id is set to the UID resulting from the hash and lexval-ext is set to NULL.

The steps at 1125 and 1126 show the rehash calculation of a new hash value in a preferred embodiment. At 1125 the current NR.lexval and NR.id are combined, and at 1126 a hash value is calculated on this combined string using the same hash function. Well-chosen hash functions will produce a different hash value from this different input value to the function. After step 1126, the processing continues back to step 1121, which is the processing to determine whether the NR.id value would result in a collision.

In the preferred embodiment, the lexical value NR.lexval and the previous hash value NR.id are combined by converting the NR.id value to a standardized string representation, and concatenating it to the end of the NR.lexval string. For example, the lexval string "John" for NR.lexval, concatenated with a hash value 24 for NR.id would be combined to produce the string "John24": other methods of combining the lexical value with the hash value may be employed as a matter of design choice. Other methods of re-hashing may be employed as a matter of design choice. One example is the use of different hash functions for rehashing.

Once the record has been added to the LexValues table, the process is complete, as shown at 1141.

Bulk Loading of RDF Data in a Preferred Embodiment

The challenge of bulk loading RDF data is the many transformations involved in getting from the lexical values of the RDF triples that are being loaded to the normalized representation. In the preferred embodiment, the need to resolve any collisions resulting from the generation of the hash-based UIDs in ways that do not affect the currently-existing LexValues and IdTriples tables is particularly challenging.

In the preferred embodiment, the necessary transformations, including collision resolution, are done in a set of what are termed in the following local tables. When the transformations are finished, entries from the local tables are merged into the LexValues table and the IdTriples table.

The local tables are shown in FIG. 10.

Details of the Local Tables

In the preferred embodiment, the bulk loading process supports loading for one model at a time. The model name is a parameter to the APIs for the bulk loading process, and the model-id used in partitioning the IdTriples table is generated by the RDBMS. However, multiple instances of the bulk loading process can execute for loading into a single model or into different models concurrently, as noted previously.

StagingTable Table 1011 in FIG. 10 shows the StagingTable table. This table has three columns, and holds the lexical values for the subjects, predicates, and objects of the RDF triples for the model currently being bulk-loaded. The sub column at 1012 holds the subject lexical value, the pred column at 1013 holds the predicate lexical value, and the obj column 1014 holds the object lexical value. 1011 shows a representative row with the UIDs for the example triple (<http://xyz.com/John>, <http://xyz.com/age>, "024"^^<http://www.w3.org/2001/XMLSchema#decimal>).

BatchLexValues Table

The BatchLexValues table is used to hold new lexical values from the model being loaded and to map the new lexical values to UIDs. Where the UIDs are hash-based, the mapping process involves dealing with collisions between UIDs for new values within BatchLexValues and collisions between UIDs for new values and UIDs in the LexValues table. All collisions are resolved before the new lexical values in the BatchLexValues table are added to the LexValues table.

1041 shows a representative row holding a distinct lexical value <http://xyz.com/John> and the corresponding UID value 100. The lexval column 1032 holds the lexical value. The id column shown at 1034 holds the corresponding UID value. If the lexical value is a literal value, and the literal value is different from the canonical version of the literal value, the canonical version of the lexical value is stored in the column canon-lexval at 1035, and the UID value in the column canon-id 1037 for the id 1034 for the entry in BatchLexValues for the canonical version of the value. Row 1043 shows such a representative row. The literal value "024"^^<http://www.w3.org/2001/XMLSchema#decimal> in the lexval column 1043 has associated UID value 200 in the id column 1034, and the UID value 400 of the canonical form "24"^^<http://www.w3.org/2001/XMLSchema#decimal> of the literal value is stored in the canon-id column. Further, the canonical value is stored in its own row in the BatchLexValues table, as shown at row 1044.

The columns lexval-ext 1033 and canon-lexval-ext 1036 are used to store the information needed to generate hash values for the entry in the manner described in the discussion of the LexValues table.

BatchIdTriples Table

The BatchIdTriples table, shown at 1051 in FIG. 10, is used to hold new RDF triples from the StagingTable as they are normalized, before the new triples are added to the IdTriples table. The table's entries include an identifier corresponding to the model for which the RDF triples are being loaded, and UIDs corresponding to the subject, predicate, and object lexical values of the RDF triples.

1057 shows an example for the UID values for the triple (<http://xyz.com/John>, <http://xyz.com/age>, "24"^^<http://www.w3.org/2001/XMLSchema#decimal>). The model-id column 1052 holds the identifier for the model, subj-id column 1053 holds the UID value for the subject of the triple, the pred-id column 1054 holds the UID value for the predicate, the obj-id column 1055 holds the UID value for the object of the triple, and the canon-obj-id column 1056 holds the UID value for the canonical form of the object lexical value.

AllCollExt Table

The AllCollExt table contains an entry for each lexical value in the LexValues table whose UID or whose canonical value's UID was generated by rehashing. The entry contains the information needed to again generate the UID.

FIG. 10 shows the AllCollExt table 1061. Column lexval at 1071 holds the lexical value. If mapping the lexical value to a hash-based UID involved a collision, the UID that was combined with the lexical value to resolve the collision is contained in collision-ext field 1072. If the lexical value is a literal value which is not in canonical form but has a canonical form and the mapping of the UID for the canonical form's entry involved a collision, the collision-ext value for the canonical form's entry which was combined with the canonical form of the literal value is contained in canon-collision-ext field 1073. A representative row is shown at 1075: the literal value "Joan" had a collision for the UID of the literal value itself, as shown by the non-NULL value 500 in the field collision-ext 1073.

Because hash collisions are rare, AllCollExt is always small and often empty or non-existent. It is used as follows:

If AllCollExt is empty or does not exist,
  hashing the lexical values in the StagingTable produced no collisions, and the UIDs needed for the IdTriples table can be made by simply hashing the lexical values in the StagingTable.
If AllCollExt does exist,
  all that is necessary to make a UID from a given lexical value in the StagingTable is to check whether there is an entry in AllCollExt for the lexical value.
If there is no such entry,
  then there was no collision involving that lexical value and no collision involving its canonical form: the UID values are computed by the default method of simply hashing, as just described.
If there is an entry, then:
  If the collision-ext entry is NULL,
    then there was no collision involving the original lexical value, and its UID is computed by simply hashing, as just described,
  If the canon-collision-ext entry is NULL,
    then there was no collision involving the canonical value, and its UID is computed by simply hashing, as just described.
  If the collision-ext entry is non-NULL,
    then there was a collision involving the original lexical value: the collision-ext value is to be combined with the original lexical value and simply hashed, to produce the UID for the lexical value.
  If the canon-collision-ext entry is non-NULL,
    then there was a collision involving the canonical form of the lexical value: the canon-collision-ext value is to be combined with the canonical value and combined value hashed, to produce the UID for the canonical form of the lexical value.

The AllCollExt table 1061 thus contains collision hash value generation information that indicates how the hash value is to be generated for those lexical values for which hash value generation resulted in a collision: in the preferred embodiment, the collision hash value generation information is the extension that must be combined with the lexical value to resolve the collision. AllCollExt thus maps lexical values whose hashing resulted in a collision to the collision hash value generation information needed to resolve the collision. Because there are only two kinds of UIDs, namely those produced from lexical values using the default hashing method and those produced using the collision hash value generation information, AllCollExt table 1061 in fact indicates for all lexical values how the UID for the lexical value is to be generated. As set forth above, if there is no AllCollExt table 1061, or if there is no entry for the lexical value in the table, the UID is generated using the default method; otherwise, it is generated using the collision hash value generation information for the lexical value in AllCollExt.

As with the entries in LexValues, many different techniques can be used in AllCollExt to indicate how the hash-based UID corresponding to the lexical value and the hash-based UID corresponding to the canonical form of the value are to be generated.

It should be pointed out here that the techniques embodied in the AllCollExt table are very general and can be used in any situation where it is necessary to regenerate hash-based UID values that include hash values resulting from collision resolutions.

Overview of Bulk Loading and the Use of Local Tables

The following is an overview of bulk loading and the use of the local tables. The bulk loading process is described in greater detail later.

1) All the triples to be bulk-loaded are loaded into the StagingTable table.
2) All the lexical values used in the StagingTable table are collected in the BatchLexValues table, and assigned initial UIDs by simply hashing.
   a. For literal values, the canonical form of the value is computed. If the canonical form of a value is different from the original value, an entry for the canonical form of the value is also made in BatchLexValues.
   b. For blank nodes—nodes for which the scope of the identifier associated with a node is only the current RDF model—an augmented string is generated consisting of the identifier of the model, plus special characters to so that it can be distinguished from other blank notes in other RDF models. For example, the blank node label _:xyz when inserted into an RDF model with model-id 5, would be augmented to make it _:m5mxyz. This is to make the resulting triples distinguishable from any use of the same blank node labels in a different RDF model.
3) Bulk operations using the RDBMS check for collisions en masse, and resolve all of them in the BatchLexValues table.
4) With all collisions resolved, the new lexical values and UIDs in the BatchLexValues table are merged into the LexValues table.
   Values that are URIs are parsed, and the value split across two columns in the LexValues table, for compression.
5) Information indicating how to generate the UIDs that resulted from collision resolution is put into the AllCollExt table.
6) The BatchIdTriples table is filled in by substituting the correct UIDs for each lexical value in the StagingTable. The UIDs for the ID triples are computed by hashing the lexical values from the staging table. If the lexical value does not have an entry in AllCollExt, the default hashing method is used to compute the UID. If the lexical value does have an entry in AllCollExt, the UID is computed as specified in AllCollExt.
7) Any duplicated rows are removed from the BatchIdTriples table.
8) The BatchIdTriples table is merged into the IdTriples Table in a bulk operation.

The bulk loading techniques described in the following ensure that RDF triples are loaded in normalized form into the IdTriples and LexValues tables. The techniques may be employed with normalized tables that use UIDs produced by hashing the lexical values in combination with hash collision detection and resolution, and also with normalized tables using UIDs produced in other ways. In the latter case, there are no collisions between UIDs, and the AllCollExt table 1061 shown in FIG. 10 is not needed, the collision extension columns lexval-ext 736 and canon-ext 740 are not needed and may be eliminated from the LexValues table 721 shown in FIG. 7, and similarly the collision extension columns lexval-ext 1033 and canon-lexval-ext 1036 are not needed and thus may be eliminated from the BatchLexValues table 1021 shown in FIG. 10.

Details of Bulk Loading

For clarity, bulk loading is first described as it is done when UIDs that are not produced by hashing are used for normalization. Next, bulk loading is described with the inclusion of hash-based UIDs.

Bulk Loading without Unique Hash Uids

Figure 12:
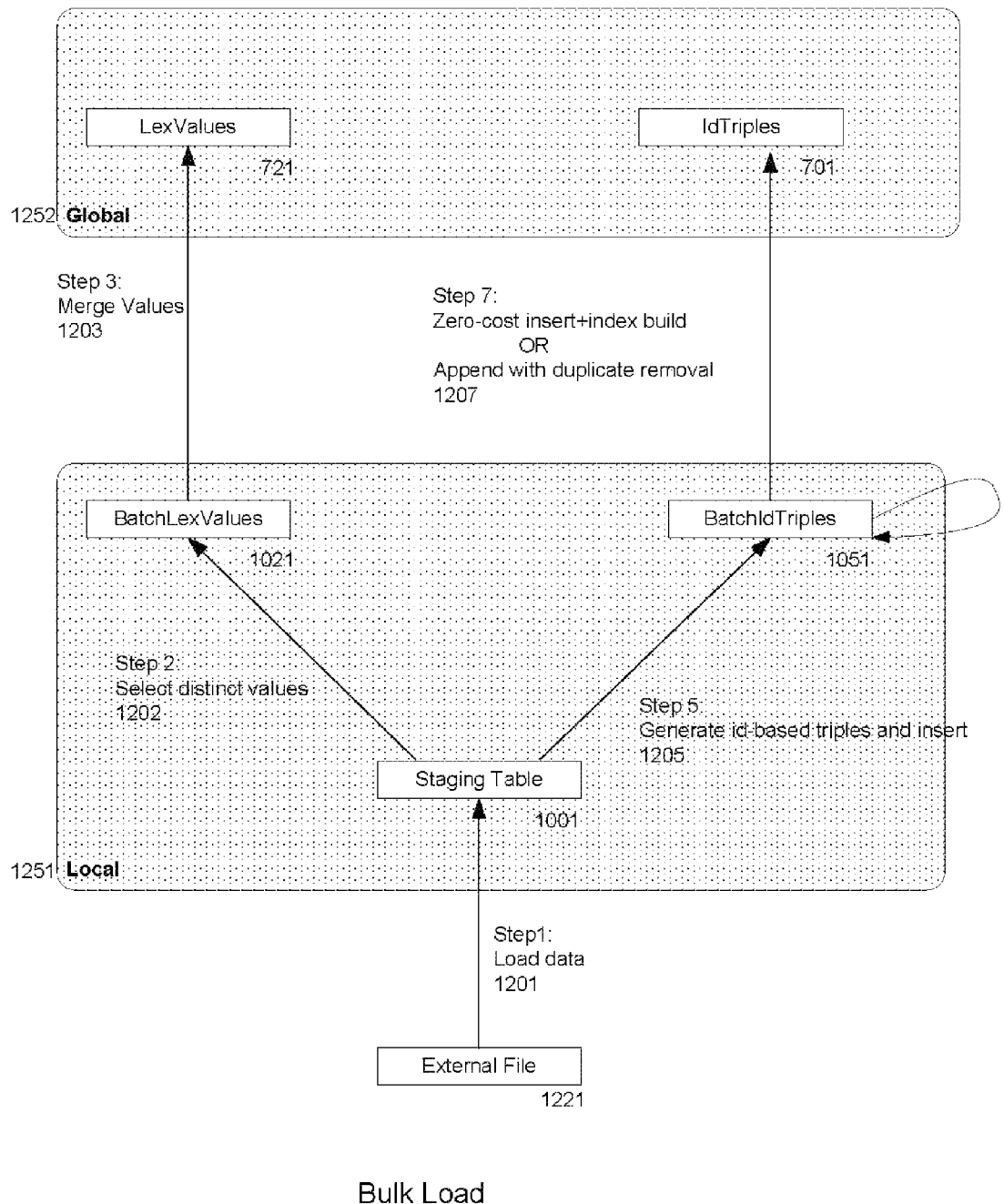
FIG. 12 shows the processing steps for bulk loading using UIDs that are not hash-based UIDs.

FIG. 12 illustrates the techniques for bulk loading without generating UIDs by hashing. FIG. 12 will now be described in detail. In FIG. 12, the local tables are shown at 1251, and the global tables are shown at 1252.

Figure 18:
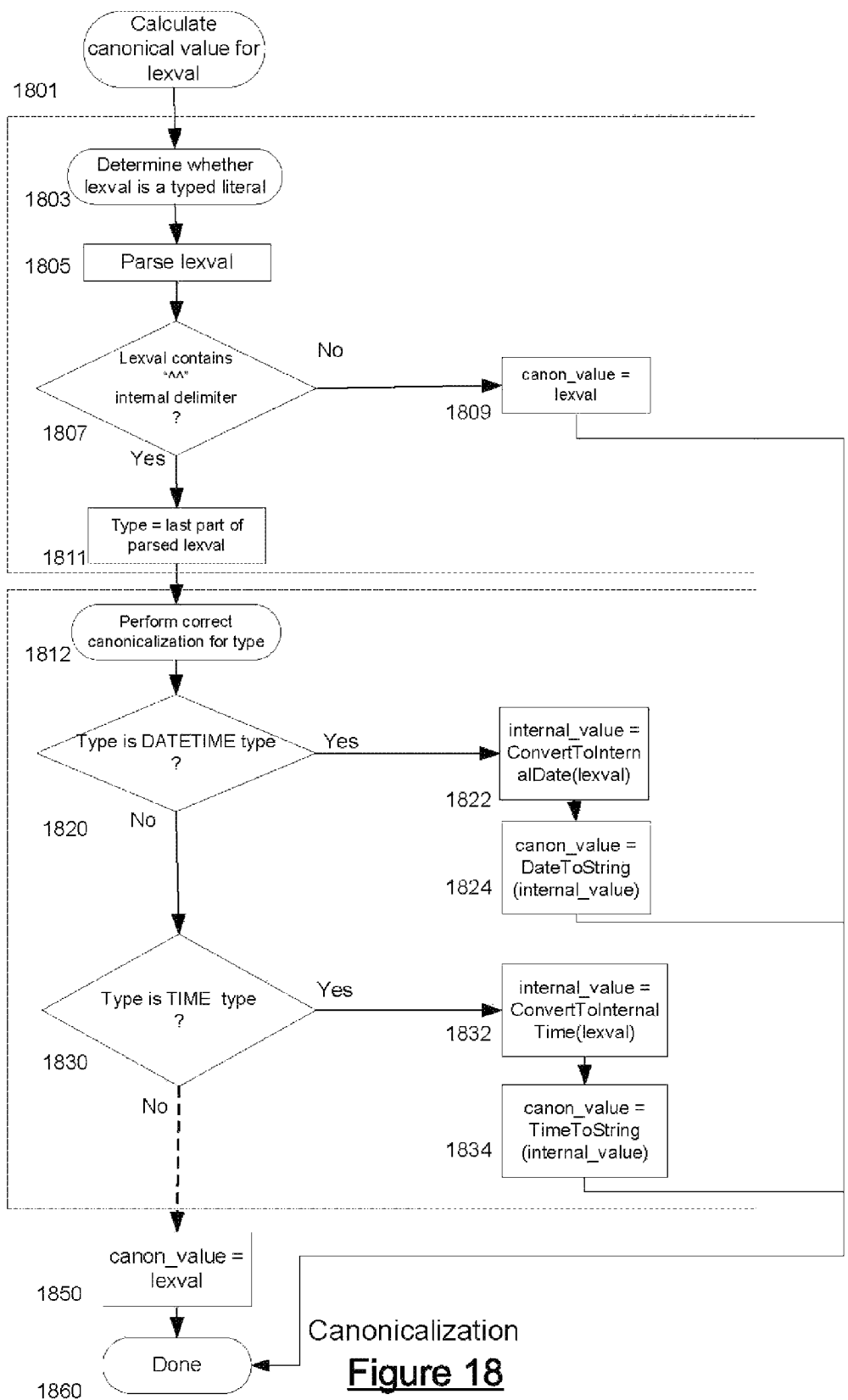
FIG. 18 shows a flowchart for canonicalizing lexical values.

1) Create local tables:
   As an initial set-up step for bulk loading, the local tables are created or initialized for the bulk, loading process. In the preferred embodiment, the StagingTable table 1001, BatchLexValues table 1021, and BatchIdTriples table 1051 as described for FIG. 10 are created by means of an SQL statement or API such as that shown in FIG. 9 at 901: FIG. 9 is further described below. Initially, each of these tables has no rows at the start of the bulk load process.
2) Load data into StagingTable table:
   1201 in FIG. 12, labeled "Step 1", shows that the RDF data is first loaded from an external file 1221, into a StagingTable local table 1001 in the RDBMS. This is accomplished by using the bulk-loading facilities of the RDBMS. Optionally, as part of this operation, the data from the external file is checked by a parsing operation to confirm that the input data is in correct RDF triple format, and that all RDF terms used in the input data are valid. Any erroneous rows are reported. The user may then correct the data that is in error, and resubmit the data for bulk load. If the input data is known already to be in the correct form without error, the parsing operation may be skipped, thus speeding up the overall bulk loading process.
   FIG. 10 shows the StagingTable table at 1001. The table consists of three columns, as previously described, for the subject, predicate, and object parts of the input data triples.
3) Process StagingTable, collect lexical values in BatchLexValues, assign UIDs:
   Subsequently as shown at 1202, labeled "Step 2", the distinct lexical values used in the RDF triples stored in the StagingTable table 1001 are inserted into a BatchLexValues local table 1021.
   a) A UID value is assigned to normalize each lexical value. The UID value is stored along with the lexical value in the same row of the BatchLexValues table 1021 as each lexical value, in column id 1034.
   b) FIG. 18 shows the steps of computing canonical values: FIG. 18 is described below. If the lexical value and the canonical form of the lexical value are not identical, the canonical value is also assigned a UID and stored in the BatchLexValues table 1021 in a similar fashion as other lexical values: further, the canonical form and the UID for the canonical form are stored in the canon-lexval column 1035 and the canon-id column 1037, respectively, in the row for the original lexical value.
   Details for the processing of literal values that are not in canonical form are described further below.
4) Merge BatchLexValues table with LexValues table:
   At shown at 1203, labeled "Step 3", the accumulated rows from the BatchLexValues table 1021 are then merged into the LexValues global table 721. The merging is done by means of an SQL MERGE statement. The SQL MERGE operation only adds rows for which the lexval value is not already in the LexValues table, thus rows for lexical values that are already in the LexValues table are not added to the LexValues table.

5) Create normalized BatchIdTriples table:

As shown at 1205, labeled "Step 5", the StagingTable is then processed to generate normalized RDF triples, in which each RDF triple from the stagingTable is converted to a normalized form by replacing for each lexical value, the corresponding UID value from the BatchLexValues table, and inserting the id-based triple into the BatchIdTriples local table 1051.

6) Remove duplicate rows from BatchIdTriples table:

As shown at 1206, labeled "Step 6", any duplicate rows in the BatchIdTriples table 1051 are removed by an SQL operation.

7) Merge BatchIdTriples table with IdTriples table:

Subsequently as shown at 1207, labeled "Step 7", the data in the BatchIdTriples table 1051 are either inserted or appended to the IdTriples table 701.

a. If the relevant model in the IdTriples table is empty, the data is inserted very efficiently by:

i. Building a new index on the BatchIdTriples table from bottom up.

ii. Performing a zero-cost insert of the data and the index into the partition of the IdTriples table. The zero-cost insertion is done by an SQL operation such as an EXCHANGE PARTITION operation.

b. If the relevant model is not empty, the data is appended by an SQL operation such as:

i. a direct-path MERGE operation, which does either an UPDATE or an INSERT if a given row is already present in the IdTriples table.

Note that FIG. 12 does not have a step labeled "Step 4".

Bulk Loading with Hash-Based UIDs.

Figure 13:
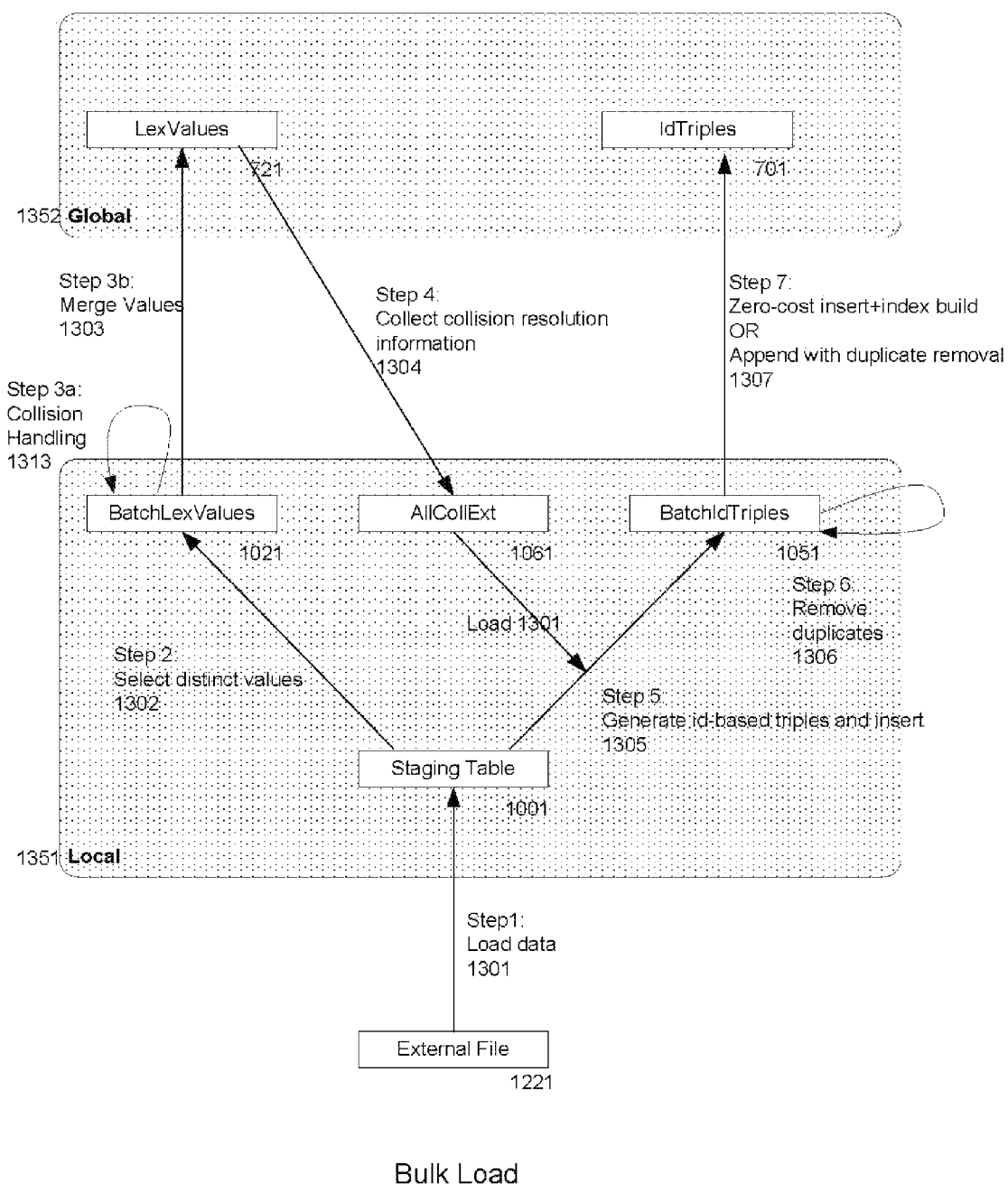
FIG. 13 shows the processing steps for bulk loading using UIDs that are hash-based UIDs.

This description refers to FIG. 13. In FIG. 13, the local tables are shown at 1351, and the global tables are shown at 1352.

The bulk loading process is as follows:

1) Load triples into the StagingTable table:

1301 in FIG. 13, labeled "Step 1", shows that the RDF triples are first loaded from an external file 1221, into a StagingTable local table 1001 in the RDBMS. This is done using the bulk-loading facility of the RDBMS.

2) Collect lexical values in BatchLexValues table, assign UIDs:

Subsequently as shown at 1302, labeled "Step 2", the distinct lexical values used in the RDF triples stored in the StagingTable table 1001 are inserted into a BatchLexValues local table 1021. For each lexical value, an initial UID value is calculated by a hash function. The lexical value and the corresponding UID are stored in a row of the BatchLexValues table 1021 in the lexval 1032 and id 1034 columns.

If the lexical value is a typed literal, plain literal with language tag, or other type of lexical value to be normalized, the canonical form for the lexical value is computed, as illustrated in FIG. 18. If it is not identical to the original lexical value, then the canonical value and an initial hash-based UID are also added to the BatchLexValues table. Also, the canonical value and the UID for the canonical value are stored in the row for the original lexical value in the canon-lexval 1035 and canon-id 1037 columns, respectively.

Details for the processing of literal values that are not in canonical form are described further below.

3) Detect and resolve all hash collisions in the BatchLexValues table.

As shown at 1313, labeled "Step 3a", a bulk operation detects all collisions by any UID value in the BatchLexValues table with any other UIDs in the BatchLexValues or LexValues tables. All collisions are then resolved in the BatchLexValues table: the collision detection and collision resolution process is described further below. For collisions that were already resolved in the LexValues table (Old collisions), the row in the BatchLexValues table is dropped, so that the mapping in the LexValues table will be what is still used. New collisions are resolved by rehashing. The hash generation information for the rehashing is stored in the BatchLexValues table in lexval-ext column 1033 for a rehashing of the lexical value, and the canon-lexval-ext column 1036 for a rehashing of the canonical value.

Further details of rehashing are given below.

4) Merge BatchLexValues table into the LexValues table:

At this point, all the new lexical values and their UIDs are in the BatchLexValues table, and there are no unresolved collisions. At shown at 1303, labeled "Step 3b", the accumulated rows from the BatchLexValues table 1021 are then merged into the LexValues global table 721.

In the merge, the rows for lexical values in the BatchLexValues table that are already in the LexValues table are not added to the LexValues table. This aspect of a MERGE operation in the RDBMS is faster and more efficient than first deleting the duplicated rows from the BatchLexValues table, as there may be a great many such rows.

In the merge operation, values in the lexval column 1032 of the BatchLexValues table that are URIs are also parsed into a prefix, or first part, and suffix, or last part. The two parts are stored in separate columns lexval-prefix 733 and lexval-suffix 734 of the LexValues table. This allows for compression of the lexval virtual column 735 and associated indices in the LexValues table. Further details of this are given below.

5) Collect information about resolved collisions into the AllCollExt table.

Generally, there will have been very few collisions to resolve, in many cases none. As shown at 1304, labeled "Step 4", a query is done on the LexValues table 721 to collect all rows that were given a rehashed UID: these are the rows that have a non-NULL value set for the lexval-ext 736 or canon-ext 740 columns. If there are any such rows, the AllCollExt table 1061 is created. From each of these rows, the lexical value and the two extension values are entered into a new row in the AllCollExt table. This is explained further below.

6) Create normalized BatchIdTriples table:

As shown at 1305, labeled "Step 5", the triples from the StagingTable 1001 are then converted to a normalized form by replacing each lexical value in the triple and the canonical form computed for the object lexical value with the hash-based UIDs to which they have each been mapped.

The UID is generated by recomputing the hash value. Where the mapped hash-based UID was generated without collision, the UID is generated by simply again hashing the lexical value. Where the UID to which the lexical value or the canonical form of the lexical value has been mapped was generated with a collision, there is an entry for the lexical value in AllCollExt. The extension value or canonical extension value in the entry is combined with the lexical value or the canonical form of the lexical value respectively, and the combined value is rehashed to produce the UID.

Finally in this step, a triple record for the BatchIdTriples table 1051 is created with the UIDs for the subject, predicated, object, and canonical-object in the subj-id 1053, pred-id 1054, obj-id 1055, and canon-obj-id 1056 columns respectively, the identifier for the model in the model-id column, and the triple record is added to the BatchIdTriples local table 1051.

7) Remove duplicate rows from BatchIdTriples table:

As shown at 1306, labeled "Step 6", any duplicate rows in the BatchIdTriples table 1051 are removed. This is shown in more detail below.

8) Merge BatchIdTriples table with IdTriples Table:

Subsequently as shown at 1307, labeled "Step 7", the data in the BatchIdTriples table 1051 are either inserted into the IdTriples global table 701, or appended to the IdTriples table 701.

a. If the relevant model in the IdTriples table is empty, the data is inserted very efficiently by
  i. first building the index or indices bottom-up, and then
  ii. performing a zero-cost insert+index build SQL operation, such as by an EXCHANGE PARTITION operation.

b. If the relevant model is not empty, the data is appended by an SQL operation that includes removal of any duplicated rows, or in other words rows in the BatchIdTriples table that are already in the IdTriples table. This is explained in more detail below.

Hash Collision Detection and Resolution During Bulk Loading

In the techniques of the bulk-loading process, collisions are detected and resolved collectively on the large "batch" of values that are being bulk-loaded, rather than singly. Among other benefits, the technique achieves improved performance by implementing transformations in the RDBMS using SQL code: for example, the optimizer of the RDBMS selects an optimal execution plan based on relative row counts and access paths for the tables involved.

Processing of Old and New Collisions

A collision set is the set of all those lexical values that hash to a given hash value, where there are two or more distinct lexical values in the set. There may be more than one collision set in a batch of values, such as a collision set of two or more distinct lexical values that all hash to the value 96, and another collision set of two or more distinct lexical values that hash to the value 105.

There are two types of collisions to be resolved during batch loading: Old collisions, and New collisions. New collisions may be local or local/global.

1. Old Collisions: collisions that have already been resolved in the LexValues table prior to bulk-loading new data. These are indicated in the LexValues table by an entry with a non-NULL collision-ext UID. The presence of the non-NULL collision-ext UID indicates that the entry's lexical value was already rehashed.

2. New Collisions: collisions that occur due to the arrival of a new value in the BatchLexValues table. New collisions are either local or local/global.

a. In a local collision, which may also be called a local-only collision, the collisions are only among new lexical values being loaded, and thus all the values in the collision set are in the BatchLexValues table.

b. In a local/global collision, one of the values in the collision set is in the data already in the LexValues table: since any new collisions are always resolved before a record is added to the LexValues table, there will never be more than one value in the LexValues table which belongs to a particular collision set.

Figure 14:
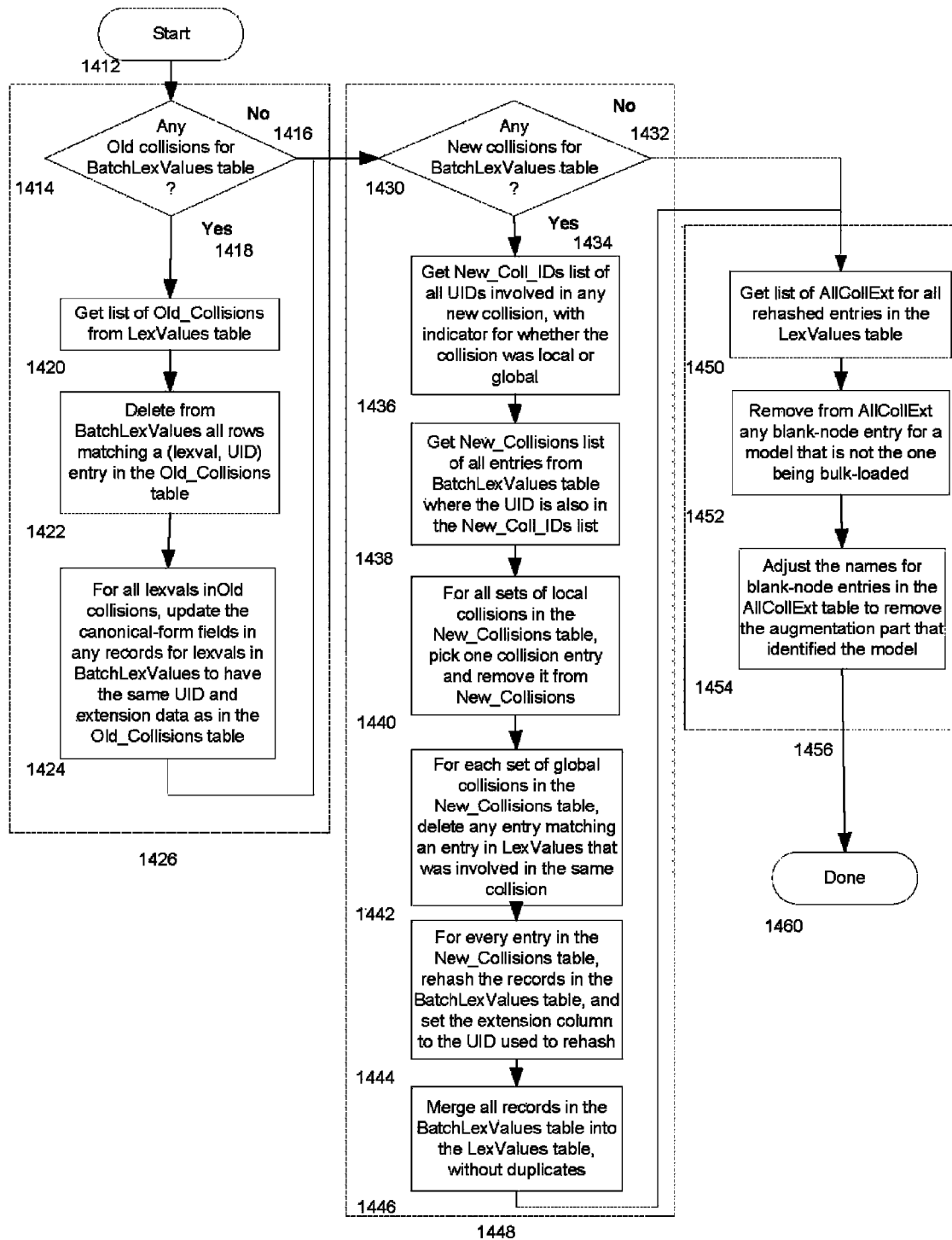
FIG. 14 shows a flowchart for creation, collision-detection, and collision-resolution of hash-based UIDs in the preferred embodiment when hash-based UIDs are mapped to lexical values during bulk loading.

Presence or absences of collisions can be determined very efficiently by an SQL "group by" or "count" bulk operation, which is very fast. Further, as collisions are rare, usually the further steps for hash resolution will be skipped. The steps are shown in the flowchart of FIG. 14. Details of certain steps are shown in a pseudo-code form of SQL in additional figures. For further information on SQL, see Oracle® Database SQL Reference 10g Release 1 (10.1), download.oracle.com/docs/cd/B14117_01/server.101/b10759.pdf.

The processing starts at 1412 in FIG. 14, and completes at 1460.

The steps below for Old/New collisions and rehashing require that the content of the LexValues table does not change during hash resolution. In the preferred embodiment, a locking protocol is used to prevent concurrent updates to the LexValues table until the merge of the BatchLexValues table into the LexValues table is complete. Note that storing canonical values in their own rows of the LexValues and BatchLexValues tables simplifies collision-handling code, since it is no longer necessary to do collision-handling for the canonical values separately. Once a lexical value in the BatchLexValues table has been rehashed to a UID that is not involved in any collision, that rehashed UID is used to update the id value, and the corresponding collision-ext to update the canon-id and canon-collision-ext of any entry that has that lexical value as its canonical value.

Old Collisions

Old collisions are collisions that were detected and resolved already, and have already been assigned a rehashed UID in the LexValues table.

1426 shows the processing for Old collisions. First at 1414, a check is done for whether there are any Old collisions to be processed. If not, the further steps for Old collisions are skipped, and thus involve no overhead. Processing then continues to the steps for New collisions, as shown at 1416.

If there are Old_collisions 1418, the next step at 1420 is to get a list of all the Old collisions in a working table Old_Collisions from the LexValues table. The next step is to delete the entries in the BatchLexValues table that match the entries in the Old_Collisions table, as shown at 1422.

1422 is the step to delete from the BatchLexValues table, all rows that reference a lexical value that is already used in a mapping in the Old_Collisions table. These lexical values already have a mapping for that lexical value in the LexValues table, and the UID that is mapped to the lexical value should not be changed. The next step is to update the BatchLexValues, as shown at 1424.

1424 shows the step to update the canon-id and canon-collision-ext columns in the BatchLexValues table for any row whose canon-lexval matches a lexical value in the Old_Collisions table, with the UID and extension in the matching row of the Old_Collisions table, so that canon-lexval, canon-id, and canon-collision-ext in the BatchLexValues table have the same mappings as in the LexValues table for any canonical value that is already in the LexValues table. This is done by scanning the Old_Collisions table for records referencing the same canonical value.

Next, the processing continues to the steps for New collisions.

Pseudo-Code Details of Old Collision Processing

Figure 20:
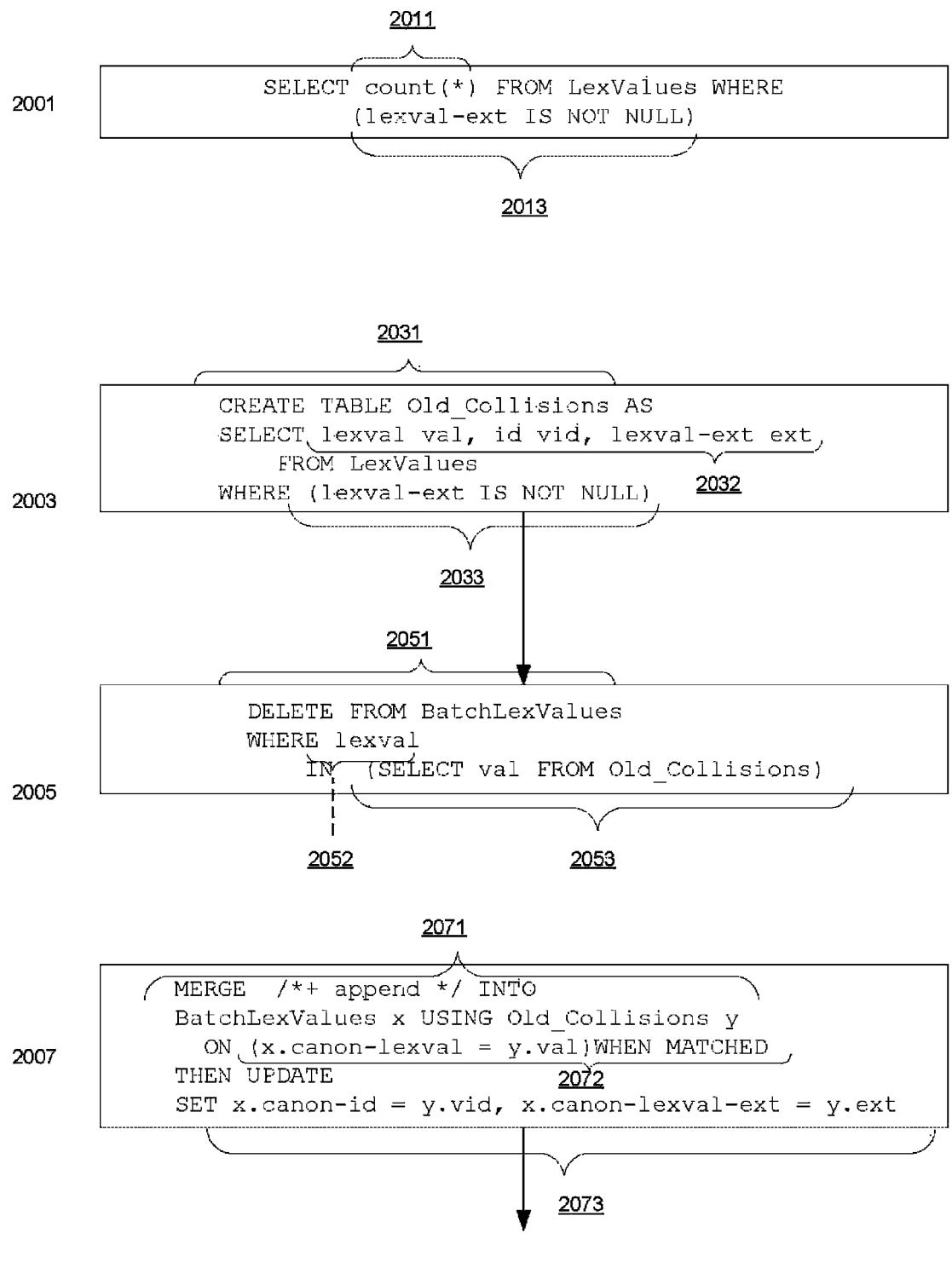
FIG. 20 shows details of the processing of old collisions.

FIG. 20 shows a pseudo-code representation of the SQL for the processing for Old collisions.

FIG. 20 is described below.

Determining Whether there are any Old Collisions

2001 in FIG. 20 shows the check for whether there are any Old collisions, for step 1414. The count (*) operation at 2011 returns the total number of rows in the LexValues table, for which the lexval-ext field is not NULL 2013. In other words, this is the count of rows for which the lexval-ext field is set to a value: if this count is zero, then there are no Old collisions. This check is done in a single query. RDBMS systems are particularly efficient at queries that do counts and check simple filter conditions such as whether fields are or are not NULL.

Equivalent operations for determining whether or not there are any Old collisions may also be used as a matter of design choice. For example, a running summary table can be maintained during all LOAD and INSERT operations that tracks whether any records with the lexval-ext field set to a value were added to the LexValues table: this summary table could then be queried, rather than querying the LexValues table as described at 2001.

Processing for Old Collisions

2003 shows a pseudo-code representation of the SQL for step 1420. A working table Old_Collisions is created 2031 with the rows in LexValues for which the lexval-ext field is not NULL 2033. The Old_Collisions table will have three columns val, vid, and ext for the lexval, id, and lexval-ext columns respectively in the rows from the LexValues table, as shown in the pseudo-code at 2032.

Continuing, 2005 shows a pseudo-code representation of the SQL for step 1422. All the rows for Old collisions are deleted 2051 from the BatchLexValues table, where the lexval column in the row—as shown at 2052—matches any val entry in the Old_Collisions table 2053.

2007 shows the pseudo-code processing for step 1424. At 2007, any canonical values in the BatchLexValues table that are also Old collisions, are updated to have the same rehashed UID used to resolve the particular Old collision in the LexValues table.

- 2071 shows the pseudo-code for doing a MERGE with UPDATE on the BatchLexValues table as x, and the Old_Collisions table as y.
- 2072 shows the pseudo-code for selecting the rows in the BatchLexValues table where the canonical value canon-lexval, matches the lexical value val in a row in the Old_Collisions table.
- 2073 shows the pseudo-code for the UPDATE operation on the canon-id and canon-lexval-ext columns in the BatchLexValues row, to be the vid and ext values from the matching row from the Old_Collisions table.

New Collisions

New collisions are collisions resulting from the hashing of lexical values in the BatchLexValues table, which were not previously resolved. New collisions will be resolved by rehashing all but one of the lexical values belonging to a collision set, so that no collisions remain. 1448 shows the processing steps for New collisions.

First at 1430, there is a test for whether there are any new collisions. If there are not, processing continues at 1432 to the processing steps for collecting a list of any rehashed entries in the LexValues table.

If there are New collisions 1434, processing continues to the step shown at 1436.

At 1436, we collect a list of all the UID values from the LexValues and BatchLexValues table that are involved in any of the new collisions. The list, stored in a working table New_Coll_IDs, also has an indicator in each entry about the size of the collision set—that is, how many records contained that UID value—and an indicator for each such UID whether all the lexical values hashing to that UD are from the BatchLexValues table, or one of those lexical values is from the LexValues table.

At 1438, the next step is to get a list of all the colliding records from the BatchLexValues table. A working table New_Collisions is set up to hold data from the records in the BatchLexValues table that contain a UID value that is also found in the New_Coll_IDs table. Processing then continues to 1440.

Steps 1440 and 1442 determine which New collision records will be rehash to resolve the collisions. One value in each collision set will not be rehashed. At 1440, a query is done to determine the collision sets for local collisions in the New_Collisions table. Then, for each of the collision sets, one of the records in the set is picked and deleted from the New_Collisions table. It is the remaining records in the collision set that will be rehashed to resolve the collisions for that set. Processing continues to 1442.

At 1442, a query is done to determine the collision sets for local/global collisions in the New_Collisions table. In each such set, if an entry matches the lexical value from the LexValues table that was involved in that local/global collision set, then that entry is removed from the New_Collisions table, because that lexical value must not be rehashed. The remaining records in the collision set will be rehashed to resolve the collisions for that set. Processing continues to 1444.

Pseudo-Code Details of New Collision Processing

Figure 21:
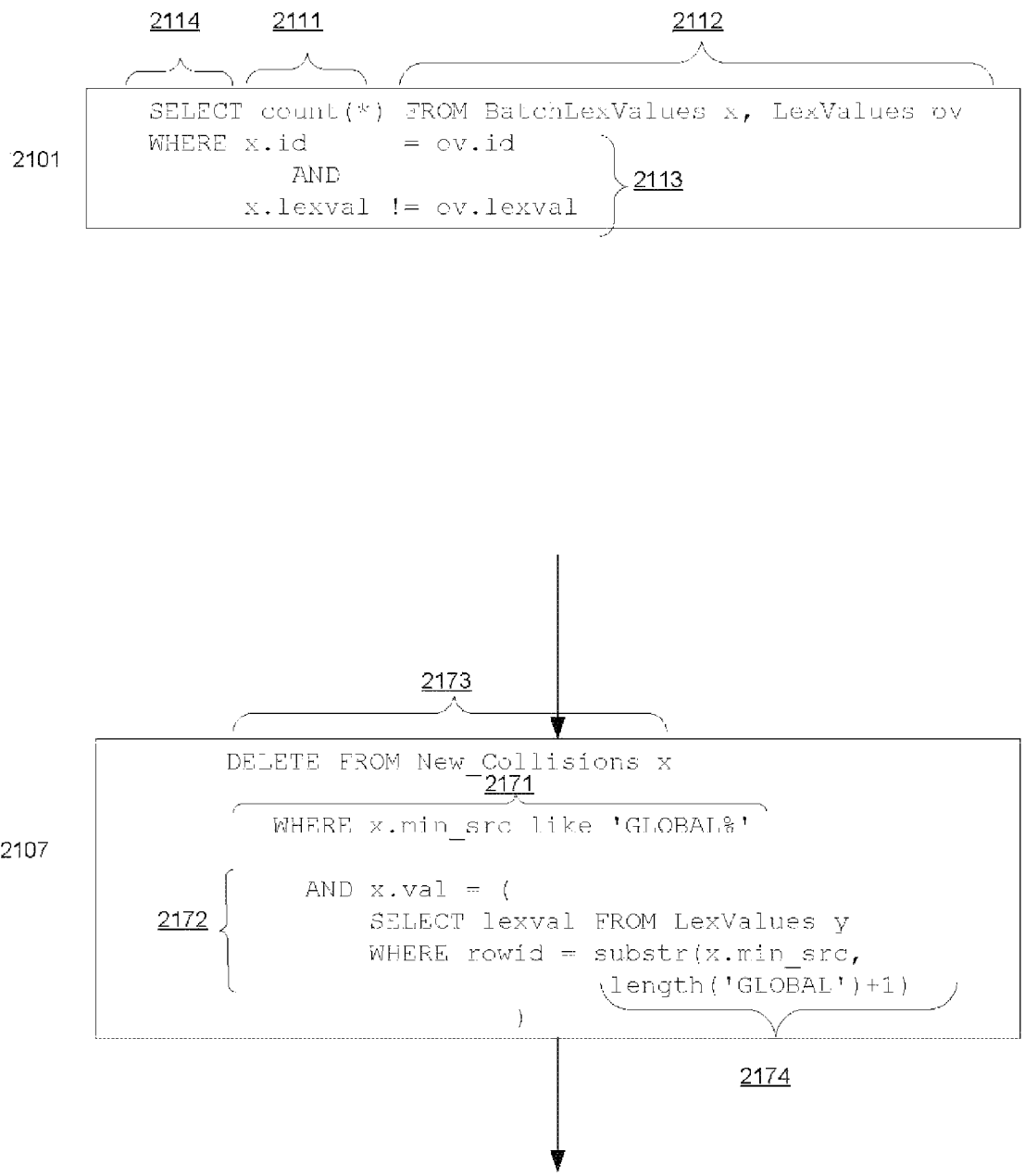
FIG. 21 shows details of the processing for new collisions that are local/global.
Figure 22:
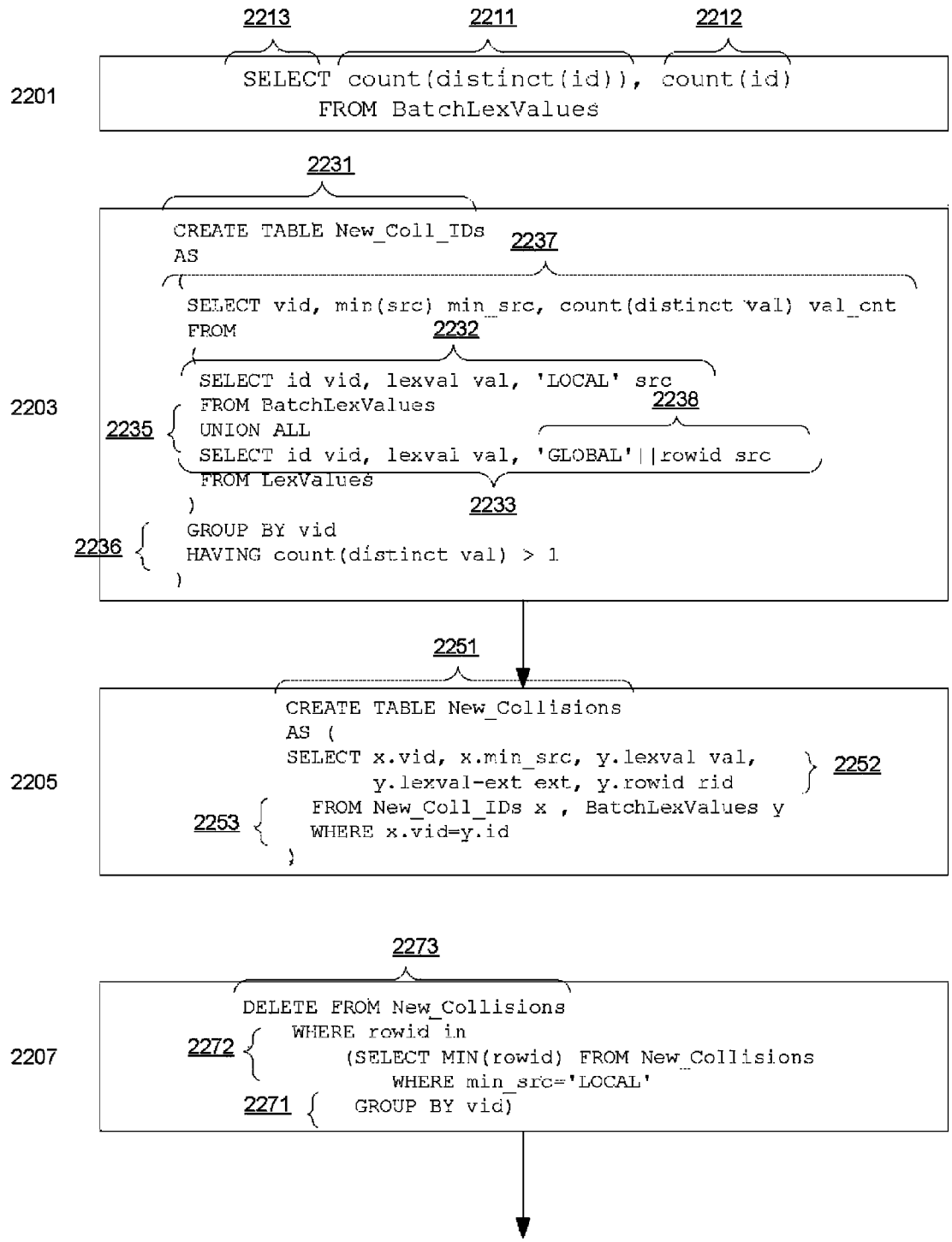
FIG. 22 shows details of the processing for new collisions that are local only.

Pseudo-code for the details of processing for New collisions is shown in FIG. 21 and FIG. 22.

Determining Whether there are any New Collisions

The test shown at 1430 for whether there are any new collisions is done in the preferred embodiment in two steps:

- A test whether there are any New collisions that form a local-only collision set.
- A test whether there are any New collisions that form a local/global collision set.

2201 in FIG. 22 shows the test for whether there are any New collisions that are local only.

- The count (distinct (id)) operation 2211 determines how many distinct id values are in the BatchLexValues table—in other words, how many values not counting duplicates.
- The count (id) operation 2212 returns how many id values are in the table, including duplicates.
- If these two counts returned by the SELECT operation at 2213 are equal, this indicates that there are no local-only collisions.
- If the two counts are not equal, then there are local-only collisions, and the steps for processing local-only collisions must be executed.

2101 in FIG. 21 shows the test for whether there are any New collisions that are local/global.

- The FROM clause at 2112 combines rows from the BatchLexValues and LexValues tables.
- The WHERE clause at 2113 restricts the combination of rows to cases where there are rows with the same UID value id in the BatchLexValues and LexValues table, but the lexical values are not the same. These are thus New collisions, in which an entry in BatchLexValues collides with an entry in the global LexValues table.

The count (*) operation 2111 determines how many rows are found by the WHERE clause.

If the SELECT operation 2114 returns a count of zero, then there are no local/global collisions.

If the SELECT operation 2114 returns a non-zero count, then there are local/global collisions, and the steps for processing local/global collisions must be executed.

Getting a List of all New Collisions

The pseudo-code details for step 1436 are shown at 2203 in FIG. 22.

2203 shows the pseudo-code for gathering a list of all UIDs involved in new collisions: in other words, a list of all UIDs that have multiple values hashing to them. These are collected into a working table New_Coll_IDs.

A working table New_Coll_IDs is created at 2231, to hold the list of all UIDs involved in New collisions.

2237 shows the SELECT statement that each row of the table will have three columns: vid, min_src, and val_cnt: vid will be the particular UID for a collision set, min_src will be an indicator for whether it is a LOCAL only, or LOCAL/GLOBAL collision, and val_cnt will be the number of records in the collision set.

First, values are collected from the relevant rows in the BatchLexValues and LexValues tables:

2232 collects the values from the BatchLexValues table. The values from each row in BatchLexValues are the id value in a working column vid, the lexval lexical value in a working column val, and an identifier 'LOCAL' in a working column src, indicating that this working row came from the BatchLexValues table.

2233 collects the values from the LexValues table. The values from each row in LexValues are the id value in a working column vid, the lexval lexical value in a working column val, and an identifier 'GLOBAL' in a working column src, indicating that this working row came from the LexValues table.

The 'GLOBAL' identifier shown at 2238 also includes the RDBMS's internal row identifier for the row from the LexValues table. This row identifier is used in a later step of processing.

The UNION ALL operation at 2235 combines both sets of working rows into one working table.

The GROUP BY operation at 2236 creates a working row for each distinct UID value vid, representing the group of rows in the working table resulting from the UNION ALL operation at 2235, each of which contains that same distinct UID as the value vid. The HAVING count (distinct val)>1 clause at 2236 selects only the working rows, for which there are multiple different lexical values with that UID. These are the working rows for UIDs that are involved in collisions that have not been resolved yet.

Finally, the SELECT clause at 2237 fills in the New_Coll_IDs table. The New_Coll_IDs table now has rows, each row with the columns vid of a UID that has collisions, the min_src indicator LOCAL or GLOBAL that indicates whether the collision set for this UID was local-only, or local/global, and a count val_cnt of how many lexical values from the combined BatchLexValues and LexValues tables hashed to that UID value.

The pseudo-code for step 1438 is shown at 2205 in FIG. 22.

2205 shows the pseudo-code for the first step for creating at 2251 a list of New collisions in a working table New_Collisions, one row for each pair of UID and lexical value in the BatchLexValues table involved in a new collision.

2252 indicates that information will be collected from a combination of the New_Coll_IDs and BatchLexValues tables.

The WHERE clause at 2253 shows that the information will be combined for the rows from the two tables, where the UID vid in the New_Coll_IDs table row is the same as the UID id in the BatchLexValues table row.

As shown at 2253, the columns in the working table New_Collisions are:

the UID vid for the collision pair, taken from the New_Coll_IDs table.

the indicator min_src for whether it was a LOCAL local only or GLOBAL local/global collision, taken from the New_Coll_IDs table the lexical value val, taken from the BatchLexValues table the lexval-ext value from BatchLexValues row for that lexical value.

the internal row identifier rid that the RDBMS used for that row in the BatchLexValues table.

Determining which Entries Will be Rehashed

In each collision set, one value will be left unchanged, and all other colliding values will be rehashed to resolve the collisions.

The pseudo-code for step 1440 is shown at 2207 in FIG. 22.

The pseudo-code for step 1442 is shown at 2107 in FIG. 21.

When resolving a collision set for New collisions which are local-only, the UID for one of the lexical values in the collision set will be left as it is, and all the other lexical values in the collision set will be rehashed to get new hash UIDs. This is accomplished by deleting the row for one of the lexical values in the collision set—in the presently-preferred embodiment, which one is deleted is chosen arbitrarily to be the one with the lowest-valued internal row id assigned by the RDBMS. This is shown at 2207 in FIG. 22.

The GROUP BY clause at 2271 divides up the New_Collisions table by groups of rows with the same UID vid—that is, the rows for each collision set—where the collisions are LOCAL only.

The SELECT clause at 2272 returns, for each such group of rows, the minimum of the internal row identifiers for the group of rows.

The WHERE clause at 2272 applies a filter to select only those rows in the New_Collisions table that match a row identifier returned by the SELECT clause at 2272.

The DELETE operation at 2273 deletes all those rows from the New_Collisions table selected out of each group of rows, one row per collision set or group.

The remaining rows for LOCAL collisions will be rehashed, thus resolving these local collisions.

When resolving a collision set for New collisions that are local/global, the UID for the only lexical value in the collision set that came from the LexValues table is left as-is. Matching entries in the BatchLexValues table are also left as-is, because they represent the same mapping. All the other lexical values are rehashed to obtain new UIDs. In the case that the lexical value in the collision set that came from the LexValues table is also present in the BatchLexValues table, then it is also present in the New_Collisions table, and thus must also be deleted from the New_Collisions table so that it is not rehashed. This is achieved by checking for relevant rows with the GLOBAL indicator from the New_Collisions table, and removing any that are found, before we rehash the rows in the New_Collisions table. 2107 shows the pseudo-code for removing such rows, if present, from the New_Collisions table.

The WHERE clause at 2171 indicates only rows from the New_Collisions table with the GLOBAL min_src indicator. For simplicity, these will be referred to here as global row entries.

Note that the GLOBAL indicator here at 2174 was set previously in the SELECT statement at 2238.

The WHERE clause and substr expression at 2172 determine the rowid value from the global row of the New_Collisions table.

The SELECT clause at 2172 selects the lexval value from the LexValues table, for the row in the LexValues table that has the internal row identifier matching the one gotten from the global row entry of the New_Collisions table.

The AND condition at 2172 states that the lexical values in the row of the New_Collisions and LexValues tables for those rows must also be the same.

The DELETE operation at 2173 deletes all these selected rows from the New_Collisions table.

Rehashing and Merging of Lexical Value Mappings

At 1444, the rehashing is done to resolve the collisions listed in the New_Collisions table—these entries are all the collision cases that need to be rehashed to resolve collisions. Rehashing is done as described earlier.

Rehashing is done iteratively on UIDs listed in the final New_Collisions table. Only UIDs in the rows in the BatchLexValues table are ever rehashed. Because the number of collisions is generally very few in the preferred embodiment, the rehashing process takes very little execution time.

At 1446, the records in the BatchLexValues table are merged into the LexValues table, without adding any duplicated records. Merging of tables is a basic operation of an RDBMS, and is done as described previously.

Processing continues with the steps to create the AllCollExt table, as shown in 1456.

Collecting Collision/Resolution Information into the AllCollExt Table

As noted earlier, the AllCollExt table holds the information needed to generate the hash-based UIDs for all of the lexical values in LexValues whose UIDs were rehashed. The processing to create this table is only done if, in fact, there are collisions, and only after the previous steps for Old and New collisions are completed and BatchLexValues has been merged with LexValues.

The steps for this are shown in 1456. First, as shown at 1450, the AllCollExt table is created and populated with data by querying the LexValues table for all the entries that indicate that a UID was rehashed to resolve a collision.

However, the LexValues table contains records for all the models stored in the system, and the bulk-loading process is only loading data for one model. The records for blank nodes for other models are not relevant to hash collision resolutions for the model being loaded. At 1452, this is addressed by removing from the AllCollExt table any blank node records that are not for the model being loaded.

Finally in FIG. 14, 1454 shows the step of removing the augmentation added to the string for blank nodes, so that the AllCollExt table can be used more easily for its intended purpose.

Figure 17:
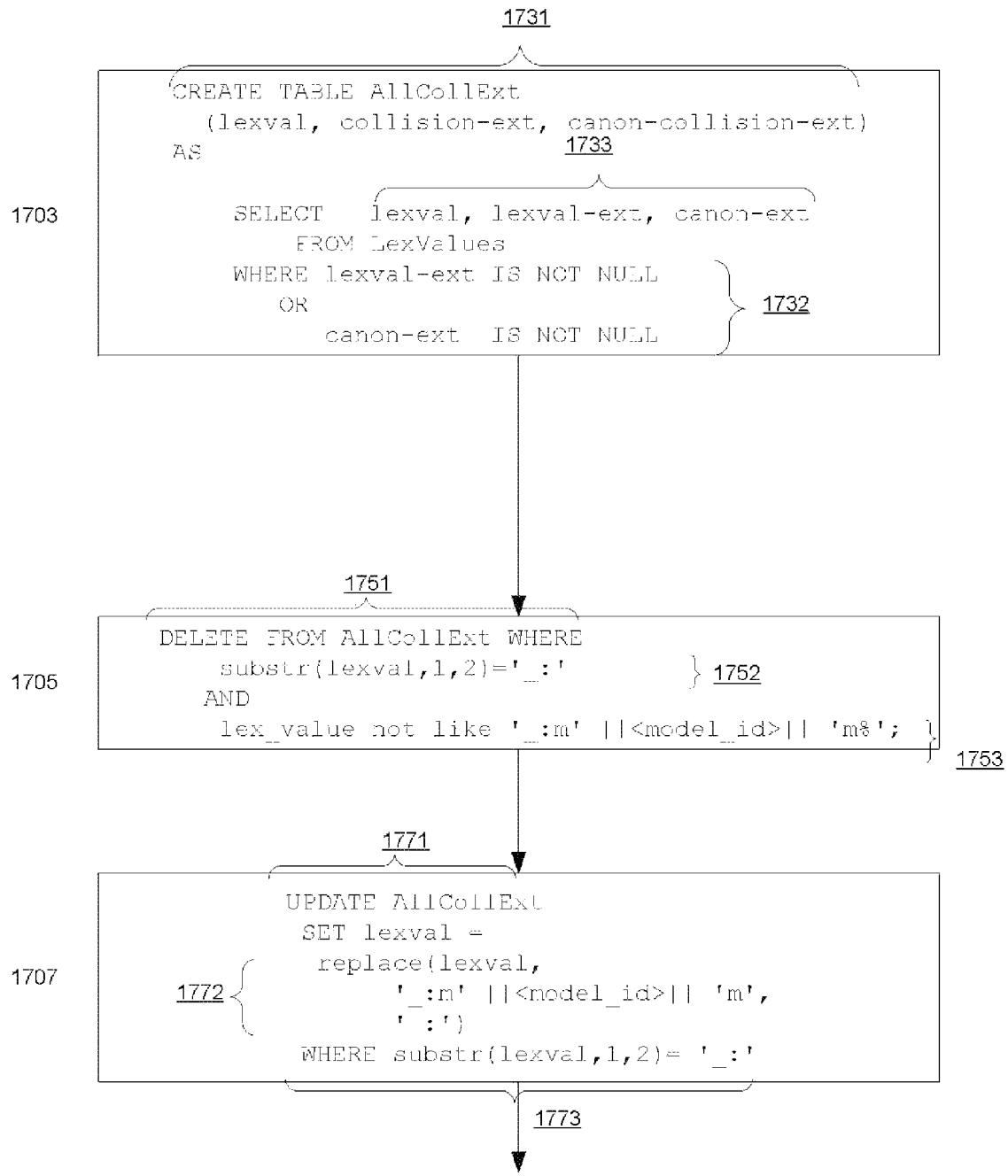
FIG. 17 shows details of the processing to collect information about resolved collisions for the AllCollExt table.

FIG. 17 shows the pseudo-code the steps in 1456 for collecting a list of all resolved collisions in the AllCollExt table. 1703 shows the pseudo-code for 1450, creating the AllCollExt table and filling it with the relevant data.

The CREATE operation at 1731 creates the AllCollExt table with three columns: lexval, collision-ext, and canon-collision ext.

At 1733, the SELECT statement fills in these three columns of the AllCollExt table with values from the LexValues table, namely lexval, lexval-ext, and canon-ext, respectively.

The WHERE clause at 1732 states that data is read from the LexValues table only for the rows where either lexval-ext is not NULL, or canon-ext is not NULL. These are the rows in the LexValues table for UIDs that had been rehashed to resolve a collision.

As noted earlier for 1452, blank nodes are filled in with an augmented lexical value based on the model identifier, so that blank nodes from different models will not be confused in the LexValues table. Thus, the operations shown at 1703 may have picked up some records from models that are not the model being bulk-loaded. These are now removed from the AllCollExt table with the operations shown at 1705.

The WHERE clause in 1751 states which rows are to be deleted from the AllCollExt table.

There are two conditions in the WHERE clause, saying that only rows that meet both of these two conditions will be deleted:

The lexval value in the row starts with the characters "_:", as shown at 1752. These are the starting characters for the special augmentation used for blank nodes—these characters make these lexical values different from other lexical values, such as URI and typed literal strings.

The lexval value does not have the name of the model model_id that is currently being loaded, as shown at 1753.

Thus, with the DELETE operation in 1751, all rows for blank nodes for other models will be deleted from the list in AllCollExt.

As a further step, 1707 shows SQL pseudo-code for 1454. Those rows for blank nodes—the rows with the special lexical value strings—are converted to remove the special augmentation with the model-id for the RDF model. This makes it possible subsequently to match this blank node lexical value with the occurrences of the same blank node in the Staging-Table.

At 1773 is the WHERE clause, stating that only the rows in AllCollExt are to be updated, where the lexval value starts with the characters "_:".

The replace operation at 1772 replaces the special value string—which consists of the two characters "_:", an 'm' character, the model identifier, another 'm' character, followed by the non-zero-length alphanumeric string—with the two characters "_:" followed by the non-zero-length alphanumeric string.

The UPDATE operation at 1771 then updates all the selected rows.

Ancillary Application Tables in Bulk Loading

As noted in the discussion of prior art, it is useful in many applications to support optional application tables for each RDF model, for holding information that is not inference data, but which is associated with particular RDF triples in the model. FIG. 9 shows an SQL statement or API 901 for the preferred embodiment for creating the StagingTable table: as can be seen, it creates a StagingTable table with three columns for the subject, predicate, and object values of the RDF triples: each value may be up to 4000 bytes in size. None of these columns may be NULL, as each RDF triple must be well-formed and complete. API 902 in FIG. 9 is a similar API for creating the StagingTable table with additional columns for the bulk loading of this ancillary information as part of the bulk loading process: the additional columns are for an internal row UID, and a column source for optional information about the source or provenance of the row: these columns may contain NULL values, as in this example it is not required that all RDF triples have this ancillary information.

In the preferred embodiment, an ancillary application table for a model is created as part of the set-up step of creating the local StagingTable table used during bulk loading, by means of the API 902. The application table for the given model is populated with data as each triple is added to the IdTriples previously described.

Locality and Partitioning in Bulk Loading

As noted in the discussion of prior art, the global IdTriples table is partitioned on the model-id column, so that each model is stored in a separate partition in the RDBMS. The bulk-loading techniques described for this system make use of this partitioning to provide performance advantages in various situations, which include:

Independent/concurrent bulk loading of separate models
Index building in bulk loading Independent/Concurrent Bulk Loading of Separate Models Because the partitions can be accessed and updated independently, a new model can be bulk loaded concurrently to queries and operations on to other models: one model can be updated via bulk load, or a new model can be bulk loaded, while other applications and users continue to make use of other RDF models stored in the RDBMS.

The hash-based UIDs disclosed herein play a part in this concurrent access. The LexValues table is shared among all models: e.g. a particular lexical value and its associated hash-based UID may be used in more than one model. The hash-collision-resolution techniques ensure that data once placed in the LexValues table will not be changed for a rehash: if this were not the case, then a bulk load of model data could require that data in other models be changed to take account of change in the LexValues table, and thus interfere with attempts to query or access those other models.

Index Building in Bulk Loading

As noted in the previous discussion of simple bulk loading of the prior art, for reasons of efficiency in this bulk loading, any indices on the table to be bulk-loaded may first be dropped/deleted, the new data loaded, and then the necessary indices re-constructed from the bottom up: this is generally faster than updating the existing indices as each row is loaded. Bulk loading of the prior art is generally applied to an entire table.

In the techniques described here, all RDF triples are stored in a single table IdTriples. However, the bulk-loading techniques disclosed here load only one model at a time, and thus are able to exploit the partitioning to achieve some of the same performance benefits as if the models were stored in separate tables. In addition to other efficiencies, the indices can be dropped/deleted for one partition, and reconstructed for one partition, without requiring that all indexing on the RDF store be updated or reconstructed.

Computing the Canonical Form for a Lexical Value

The following describes the steps in FIG. 18, showing how canonical forms of values are calculated in the preferred embodiment. In the preferred embodiment, canonicalization is only done for literal values, and literal values may only be used in the object value of an RDF triple. Thus, canonicalization need only be considered for lexical values in the obj column 1014 of the StagingTable table 1001.

For clarity, FIG. 18 illustrates the canonicalization of typed literal values, and uses exemplary names for built-in functions and internal data types. As is readily apparent, canonicalization for other data formats can easily be implemented in a similar fashion. For example, plain literals with language tags can be processed similarly. Examples of plain literals with language tags include following:

"red"@en-US
"chartreuse"@en-US

These examples consist of a value part, such as the word red, followed by an internal delimiter @, and by a language tag part, such as en-US or en-us, which indicate that the language is American Standard English. Canonicalization for color values may be done, for example, by changing the language tags to all lowercase.

FIG. 18 shows how the canonical form of a typed literal value is calculated in a preferred embodiment, starting at 1801.

1803 shows the start of the steps to determine whether the value lexval is a typed literal. The canonical form will be stored in the variable canon_value.

At 1805, the string of lexval is parsed to determine whether it contains the character sequence "^^", or two carets.

This character sequence is an internal delimiter in a typed literal format, between the first value part of the typed literal string, and the final type part that indicates the data type of the typed literal.

The "^^" character sequence must be internal to the value string, that is, it may not start at the first character of the string, and may not include the last character of the string.

1807 shows a test for whether there is such an internal delimiter.

If not, the processing continues to 1809, where the canon_value variable is set to be the same as the lexval value, indicated that there is no special canonical form. The steps are now complete, and continue to 1860.

As shown at 1811, if there is such a delimiter, the variable Type is set to the last part of the parsed lexval string, namely the type part of the typed literal.

1812 shows the start of processing to perform the correct canonicalization for the typed literal. The value of the Type variable is checked to select the particular canonicalization code that is appropriate.

1820 shows a test to determine whether the Type string the particular string used to indicate a DATETIME type.

If it is the string for a DATETIME type, the branch is taken to 1822.

If it is not the string for a DATETIME type, processing continues to 1830.

At 1822, a standard built-in function or other function, here shown as ConvertToInternalDate, converts the lexval string to the internal RDBMS representation for a date, and stores it in a variable internal_value.

At 1824, a second standard built-in function or other function, here shown as DateToString, converts the value of the variable internal_value to a string format suitable for printing or other use. This function DateToString is a standard function, and will always produce values in the same format and the same form.

The steps are now complete, and continue to 1860.

Continuing at 1830, we have the steps for the next type of typed literal that may be canonicalized, namely TIME values. The processing steps are analogous to those for DATETIME values.

1830 shows a test to determine whether the Type string the particular string used to indicate a TIME type.

If it is the string for a TIME type, the branch is taken to 1832.

If it is not the string for a TIME type, processing continues further, as shown.

At 1832, a standard built-in function or other function, here shown as ConvertToInternalTime, converts the lexval string to the internal RDBMS representation for a time, and stores it in a variable internal_value.

At 1834, a second standard built-in function or other function, here shown as TimeToString, converts the value of the variable internal_value to a string format suitable for printing or other use. This function TimeToString is a standard function, and will always produce values in the same format and the same form.

The steps are now complete, and continue to 1860.

At the dotted line from the "No" branch of 1830 to element 1850, canonicalization of other data types is done. These steps are analogous to those already shown, and as they are readily apparent, they are omitted for clarity.

As shown at 1850, if the lexval value is determined to be a typed literal, but is not a typed literal of any type for which canonicalization is done in the particular implementation, the canon_value variable is set to be the same as the lexical value lexval.

Processing is now complete, as shown at 1860.

Other techniques and variations for canonicalizing values may be employed as a matter of design choice. For example, an RDBMS system may have standardized functions such as ToInternal and ToString that respectively both employ inspection, and can convert any known typed literal to the appropriate internal representation, and an internal value to an appropriate output string. In this case, these functions may be employed, thus eliminating the need to test for specific values of the Type string variable and call distinct functions. Canonicalization can also be done for other data formats, depending on the particular implementation, or as a matter of design choice.

Processing of Literal Values that are not in Canonical Form

Details of the processing for literal values which are determined not to be in canonical form, and for which a canonical form is determined, will now be described.

As noted previously, literal values are permitted in the object position of the RDF triples in the StagingTable. When records are first added to the BatchLexValues table:

If a lexical value is known not to be a literal, or if the canonical form of a literal value is identical to the original value, then
  the canon-lexval and canon-id fields in the BatchLex-Values table are set to NULL.
  the lexval and id fields are set to the original value and to the hash value computed for the original value, respectively.

If a canonical value for a literal is computed, and it is different from the original value, then
  the canonical form is stored in the canon-lexval field, and the hash value computed for the canonical form is stored in the canon-id field.
  the lexval and id fields are set to the original value and to the hash value computed for the original value, respectively.

The lexval-ext and canon-lexval-ext fields are set initially to NULL.

Thus, a non-NULL value in the canon-id field in the BatchLexValues table indicates that there is a canonical form for the lexval value, and the values of the canon-lexval and canon-id fields give the canonical form, and the UID for the canonical form, respectively.

Once all lexical values have been entered into the BatchLexValues table,

A query is done to determine whether there are any entries in the BatchLexValues table with a non-NULL value in the canon-id field.

If so, then a further query obtains a list of all the distinct values in the canon-lexval column and corresponding canon-id values where canon-id is non-NULL, and these values are added as records to the BatchLexValues table.

In the new records, the lexval field is set to the canon-lexval value and the id field is set to the corresponding canon-id value from the list entry, and the canon-lexval, canon-id, lexval-ext and canon-lexval-ext fields are set to NULL.

Thus, any canonical values that were not already in the BatchLexValues table as lexval values, are added with their initial UID values as additional records.

Subsequently, when resolving collisions,

All resolved collisions will have been rehashed for the colliding lexval values in the BatchLexValues table, and the lexval-ext field for those records will be non-NULL.

For all resolved collisions, a query is done to identify all records in the BatchLexValues table for which the canon-lexval value matches a lexval value for a record that was rehashed.

For each such record, the canon-lexval-ext and canon-id values are set to the lexval-ext and id values from the rehashed lexval record.

When the BatchIdTriples table is populated, no reference is made to the BatchLexValues or LexValues tables: to determine the UIDs for any lexical values that were involved in a resolved hash collision, the AllCollExt table is referenced.

As this table is very small or possibly even empty, this is generally much more efficient than a lookup or join to the BatchLexValues or LexValues tables, as has been described.

Further, the canon-obj-id UID value 1056 for the canonical form for each lexical value present in the StagingTable, is determined by computing the canonical form again from the lexical value, and then computing the corresponding UID by the previously described mapping by means of the default hash function and if necessary the hash value generation information in the AllCollExt table.

This computation is generally much more efficient than the alternative of looking up or doing a join with the BatchLexValues or LexValues tables to determine the canon-obj-id UID value.

Note that the LexValues table stores the UID for a canonical value in the canon-id field in the same fashion as does the BatchLexValues table. Thus If the canon-id field is non-NULL, it is a flag that indicates that the lexical value has a canonical form, and the canonical form is different from the original lexical value.

If the canon-id field is NULL, then there is no differing canonical form for the original lexical value.

Table Compression

URI values constitute a significant portion of the data in RDF triples, thus improvements in the compression of URI data and indices on columns storing this data can significantly reduce the amount of storage required overall, and also lead to improved performance.

Characteristics of URI Data

In the preferred embodiment, certain special properties of the URI data format are exploited so that the techniques of index key prefix compression and of table column compression of the underlying RDBMS can be used to achieve a substantial reduction in the amount of storage required: index key prefix compression and table column compression in an RDBMS are described further below.

The special properties of the URI format include the following:

One special property of the URI format used in breaking the string into the two parts, is that URIs contain a number of "/" and/or "#" internal delimiter characters, and that the strings can be divided into a prefix and suffix at the last such internal delimiter in each string.

Another special property exploited in the techniques disclosed here is that in real-world RDF data, typically many of the distinct URI values used will have the same first part or prefix.

Further, another special property is that in real-world RDF data, generally many of the prefix parts will be longer than the suffix parts.

In the preferred embodiment the prefix is the first part of a URI string, and the suffix is a last part of the URI string: together the prefix and the suffix make up the entire URI string. An example of the URI format is shown in FIG. 7. 741 shows a representative row of the LexValues table that contains a lexical value that is a URI, namely <http://xyz.com/John> and the corresponding UID value 100. Note that the lexval column at 735 is a virtual column computed by concatenating the lexval-prefix column 733, holding for example <http://xyz.com/, and the lexval-suffix column 734, holding for example John>.

Figure 19:
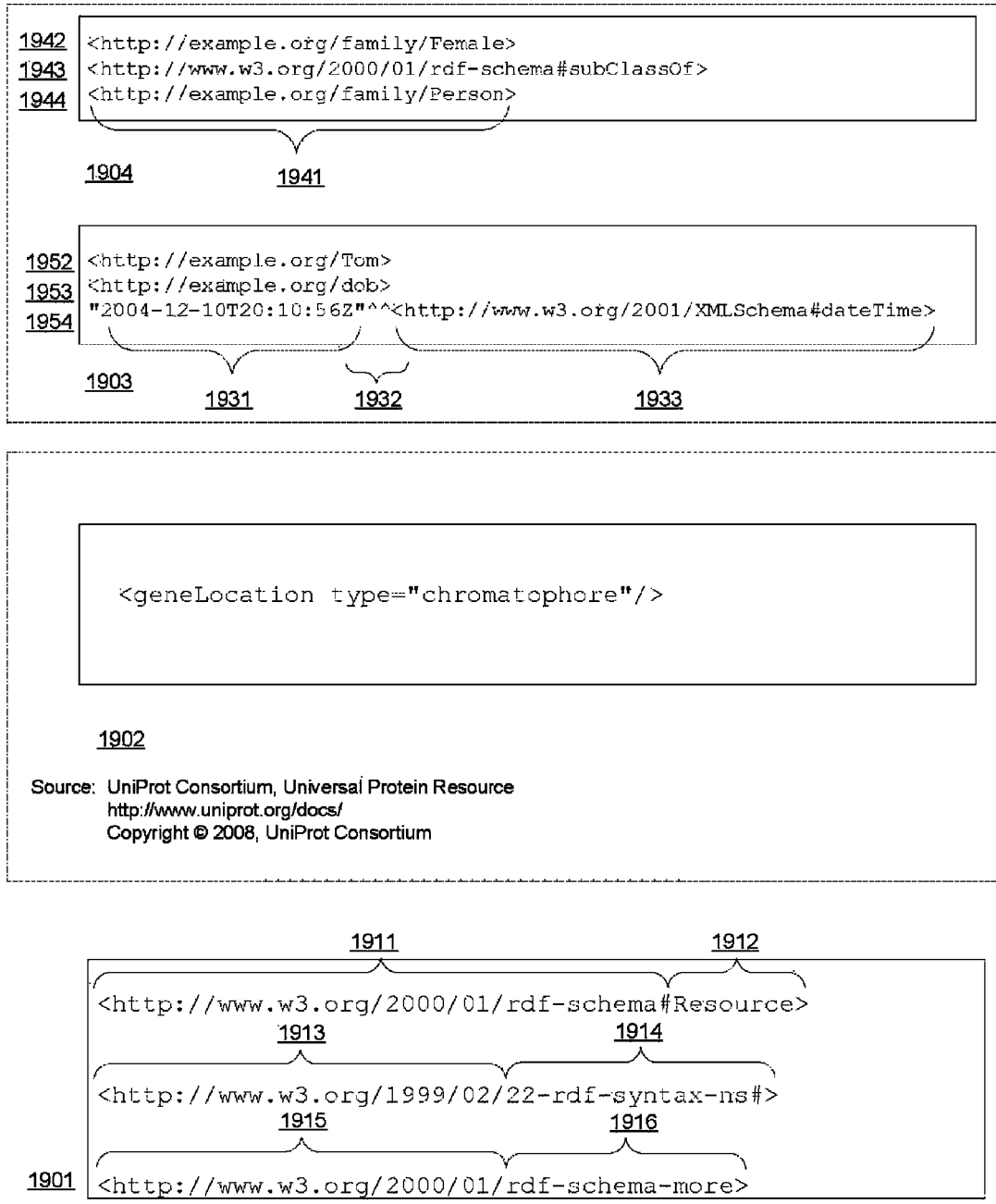
FIG. 19 shows examples of RDF data in a standard format that is part of an RDF dataset to be bulk loaded.

In FIG. 19, 1901 shows three further examples of possible URI values, such as might be used in a triple in N-Triple format. For the purposes of this system, URI values may employ internal delimiters consisting of a single "/" slash-mark character, or a single "#" number-sign character.

1911 and 1912 show the prefix and suffix of a URI value divided by a final internal delimiter "#".

1915 and 1916 show the prefix and suffix of a URI value divided by a final internal delimiter "/": 1913 contains other instances of a "/" delimiter, but they are not final internal delimiters in the URI value.

1913 and 1914 show the prefix and suffix of a URI value divided by a final internal delimiter "/": there is a "#" character delimiter at the end of 1914, but it is not an internal delimiter because it is at the end.

Note that prefix compression and parsing may be performed in a variety of manners. For example, depending on the format of the data, it may be appropriate to reverse the role of prefix and suffix: the last part of the value can be stored as a prefix in the RDBMS, and the first part stored as the suffix, in order to take advantage of optimizations and features of the RDBMS, while combining the two parts in the original order when reading them from the RDBMS.

Parsing URI Values into a Prefix and Suffix

In the preferred embodiment, URI values are parsed by scanning the URI string to locate the rightmost internal delimiter character in the string value. The part of the URI string up to and including this delimiter character is the prefix part of the string, and the remaining part of the string is the suffix part of the string. This operation is performed in SQL, as illustrated in the pseudo-code example in FIG. 16. In the description of FIG. 16, a URI delimiter is either of the characters "/" or "#".

1601 in FIG. 16 shows pseudo-code for an initial SQL statement, executed before the other steps:

An expression vname_expr is defined that is a copy of the URI value lex_value, as shown at 1611.

1602 shows pseudo-code for the SQL statement to extract the prefix part of the URI value, and store it in a variable prefix_val.

1622 shows an initial test to check whether the URI value is too long to fit into the defined length MAX_SUFFIX_LENGTH, as calculated at 1621. MAX_SUFFIX_LENGTH is the size of the lexval-suffix column 734.

If the URI value is not too long, the THEN clause of the statement is executed.

If it is too long, the ELSE clause is executed.

The THEN clause consists of a call to the NVL operation, which executes on two values. This operation checks whether the first value is NULL: if it is not, then NVL returns the first value. If however the first value is NULL, then NVL returns the second value.

The first value is a nested function substr(Instr( )) expression at 1623. This expression determines the location of the final internal URI delimiter character in the vname_expr value.

If there is such a URI delimiter, the NVL operation returns the results of the substr expression, which is the first part of the string up to and including the final delimiter character.

If there is no such delimiter, the substr function returns NULL: the NVL operation will then return the second value, which is just the entire string.

The second value for the NVL operation is shown at 1624: it is the original URI value.

Thus, if the THEN clause is executed, the value returned for the prefix is either the URI string up to the final internal URI delimiter, or else the entire string if there is no such delimiter.

At 1626, we have the ELSE clause, which is executed if the URI string may be too long for the lexval-suffix column 734. The substr expression 1625 returns as much of the URI string as will leave MAX_SUFFIX_LENGTH characters remaining. This will be concatenated with the return value from the NVL expression at 1627.

1627 shows the first value for the NVL expression. This first value is a substr expression on the last MAX_SUFFIX_LEN part of the URI string, where it uses an instr expression to locate a final internal URI delimiter.

If there is a final URI delimiter, it returns the first part of this section of the URI string.

If there is no such delimiter found, the second expression at 1628 is returned, which is the rest of the URI string not returned at 1626.

The second value for the NVL operation is the end of the URI string consisting of the last MAX_SUFFIX_LEN characters.

Thus, if the ELSE clause is executed, the value returned for the prefix is either the URI string up to the final internal URI delimiter that will not leave the suffix part too long, or else the entire string,

1603 shows in pseudo-code the computation for the suffix string.

The substr expression at 1631 returns whatever part of the URI string follows the part returned for the prefix.

If the prefix is the entire URI string, then the suffix string is empty.

As shown in FIG. 7, these two parts are stored in separate columns in the LexValues table in the lexval-prefix 733 and lexval-suffix 734 columns.

As noted above, in RDF data the prefix part of the URI strings can be considered a less variable part, as many URI values in real-world data share the same first part of the string, or prefix, and differ in the suffix part.

This parsing is powerful and efficient. It functions for any type of URI data, without requiring that there be a list of known prefix strings.

A further property of RDF triple data, is that in real-world RDF triple data, many triples will describe facts about different objects, but a significant number of triples will have the same object and predicate—more so in fact if the object values are canonicalized—while relating to different subjects. For example, there are often a number of triples about many different subjects, stating that they are each members of the same RDF class. An example is shown in FIG. 15.

Figure 15:
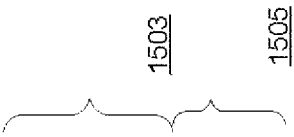
FIG. 15 shows examples of RDF triples that have the same predicate and object parts.

1501 in FIG. 15 shows 5 triples from an exemplary RDF model describing in part the employees in a company.

The three triples shown at 1503 represent that David, Gertrude, and Shih-Lin are all managed by Charlotte.

The two triples shown at 1505 represent that Charlotte and Albert are managed by Pat.

As is shown, the three triples at 1503 all have the same predicate and the same object, namely "managedBy" and "Charlotte", respectively.

Similarly, the two triples shown at 1505 have the same predicate and object, namely "managedBy" and "Pat".

The following short overviews of index key prefix and table column compressions in an RDBMS are provided for reasons of clarity. For further information on RDBMS techniques for compression of data and compression of indices, see Oracle Database Objects 10g release 1 (10.1): Chapter 5 Schema Objects, download.oracle.com/docs/cd/B14117_01/server.101/b10743/schema.htm.

Index Key Prefix Compression.

Index key prefix compression is a feature of many RDBMS systems applicable to uniqueness constraints or indices.

If a uniqueness constraint or index is defined on multiple columns—one or more columns which are the prefix, and additional columns which are the suffix—and further, if there are several instances of the prefix part in the data which have the same value, then the indexing mechanisms of the RDBMS internally store the index in a more concise and efficient form. Internally, the RDBMS index is sorted by the prefix: the order in which records are added to the database thus does not affect the amount of compression achieved by index key prefix compression.

In the preferred embodiment, a key prefix of length one is defined for the lexval uniqueness constraint and enforced by a unique index on the LexValues table for the lexval-pre fix and lexval-suffix columns. As noted, in real-world RDF data many URIs will share the same prefix part, when parsed according to the technique described above. Thus, the storage of the LexValues table achieves substantial compression and increased performance in the uniqueness index constraint on the lexval virtual column.

Further, as noted previously, in real-world RDF data, generally a number of RDF triples will involve the same object and predicate, especially when the object value has been canonicalized.

In the preferred embodiment, key prefix compression of length 2 is also defined on the (pred-id, canon-obj-id, subj-id, model-id) columns of the IdTriples table.

Table Column Compression

Table column compression is a feature of certain RDBMS systems, by which repeating values in a column, repeating values in disparate columns, and repeating sequences of values in a sequence of columns are compressed when the values are stored in the same database block. One factor affecting the extent of actual compression is the order of arrival of data, as that affects which values are stored in which database blocks.

By parsing out the less variable prefix part of URI strings, into a separate column, there is a substantial probability that values in that column will be repeated in a database block. This in turn results in greater compression of the data in the RDBMS, and often improved performance as well.

Background of Table Column Compression in an RDBMS

There are several known techniques employed in RDBMS systems for compressing table columns. Of interest here is that many RDBMS systems can store repeated data in a database block more compactly, by use of techniques like the following:

creating a symbol table of the repeated values used in the rows stored in the block, along with a numeric ID for each value.

storing this symbol table internally in the database block (where it occupies a small amount of space).

replacing actual values in the records in that block, with the numeric IDs.

Generally the numeric IDs require less storage than the original values, thus the records occupy less storage space.

A further known technique employed in many RDBMS systems relates to the storage when a value is NULL: this will be the case for the lexval-ext and other columns in the Lex-Values tables.

A NULL is not a value, instead it means that there is no value in the column at all.

An RDBMS system allocates no space for columns in a row that are NULL, merely an indicator of the column's existence.

Thus, tables that contain many NULL values, require less storage space than if the columns contained a special value such as zero.

Background of Index and Index Key Compression in an RDBMS

There are also known techniques employed in RDBMS systems for compressing indices. One of those of interest has to do with prefix key compression.

If the key value used in an index is a string, and if the keys can be broken into two parts—one part called the prefix that generally does not change often in the index, and a second part called the suffix that does—then prefix key compression can result in the index being stored in less space. Somewhat similar in concept to column compression for repeated values, one aspect is that the less varying parts with the same value will be stored once, and the index changed so that the entire key (with both parts) is not stored.

This results in less space being required for storing the index.

Indices for which the keys have no suffix part can sometimes still be stored more efficiently using prefix key compression, as the RDBMS can use the internal row number of the table in the RDBS to replace the suffix.

A further set of known techniques employed in RDBMS systems relates to queries as to whether a particular column is or is not NULL. This will be the case for the lexval-ext and other columns in the LexValues tables.

The property of being NULL—of having no value at all—can occur quite often for data stored in an RDBMS. On technique employed in RDBMS systems is to store a special indicator in a database block, if for a particular column, all the records stored in that block have only NULL for the value in that column.

With this or a similar technique, a query that tests whether a given column is or is not NULL can first check the special indicator on the block, and thus frequently avoid having to process any of the actual records stored in the block. This can greatly speed up such types of queries.

Concurrent Bulk Loading

In the preferred embodiment, the bulk loading process loads data for one model. However, multiple instances of the bulk loading process can execute for different models concurrently. This is because in the preferred embodiment

- Separate local tables are created for each bulk loading process. Operations by each bulk loading process on its own StagingTable, BatchLexValues, BatchIdTriples, and AllCollExt tables—described below—and other local tables employed in a particular implementation, can thus be done concurrently and independently of other bulk loading processes.
- Models are partitioned in the global IdTriples table. One model/partition can be updated by locking the one partition when the BatchIdTriples data is merged with the data for that model, performing all updates, and then releasing the lock.
- Accesses to the global LexValues tables is interlocked: only one bulk loading process at a time is thus able to detect collisions with and to update the LexValues table, and it does not unlock the LexValues table until it has completed all updates to the table.
- Initial UID values are computed by default hashing which does not involve access to the LexValues table, thus in this step the LexValues need not be locked to prevent concurrency. Further, collision detection and resolution is done without updating the LexValues table, and no update to the LexValues table changes any existing entry: thus the LexValues table does not need to be read-locked during these steps to prevent read-concurrency.
- Once a process has resolved the collisions in its bulk-load batch, its BatchIdTriples table can be normalized without accessing the LexValues table. This is the case for two reasons: once an entry is added to Lexvalue, the entry never changes, and a process's AllCollExt table, which is made after the process has updated the Lexvalue table, preserves the state of LexValue as regards hash methods as of the time the process made the AllCollExt table. Thus, a process need not lock the LexValues table to prevent concurrency while normalizing its BatchIdTriples table.
- Further, a single model can be updated by multiple bulk loading process instances: for example, different parts of a model, such as the first half of the triples and the second half of the triples, by two different instances. The locking techniques above serialize access to the object being locked: one instance waits for the other to finish the particular step before starting those steps that involve updates to the object, such as to the LexValues table and to the IdTriples table. Other operations in the bulk loading process operate only on the local tables for the particular instance of the bulk loading process—thus in these operations the two different instances do not interfere with each other and may execute concurrently.

Figure 1:
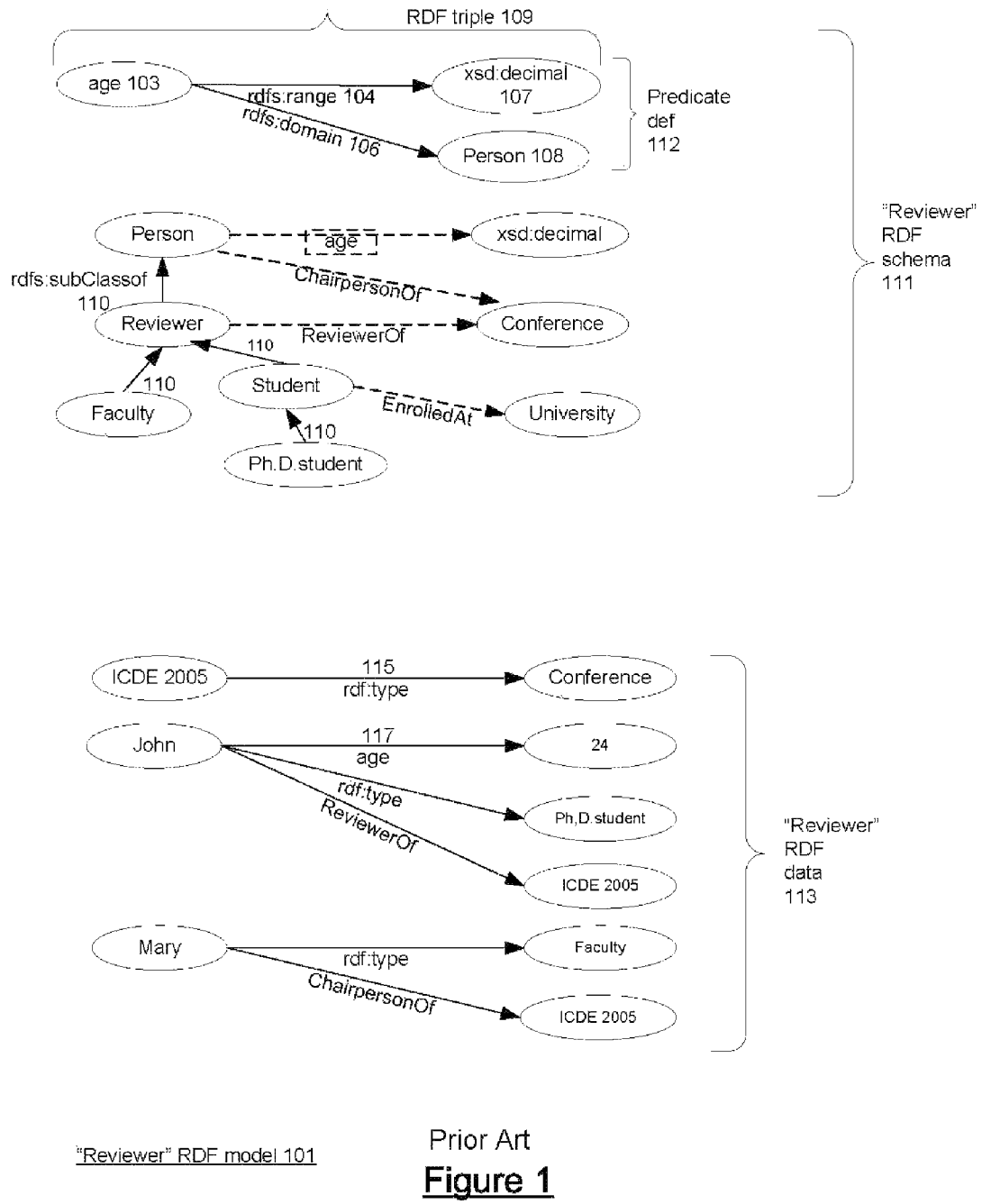
FIG. 1 is an exemplary illustration of RDF triples shown as a graph.
Figure 3:
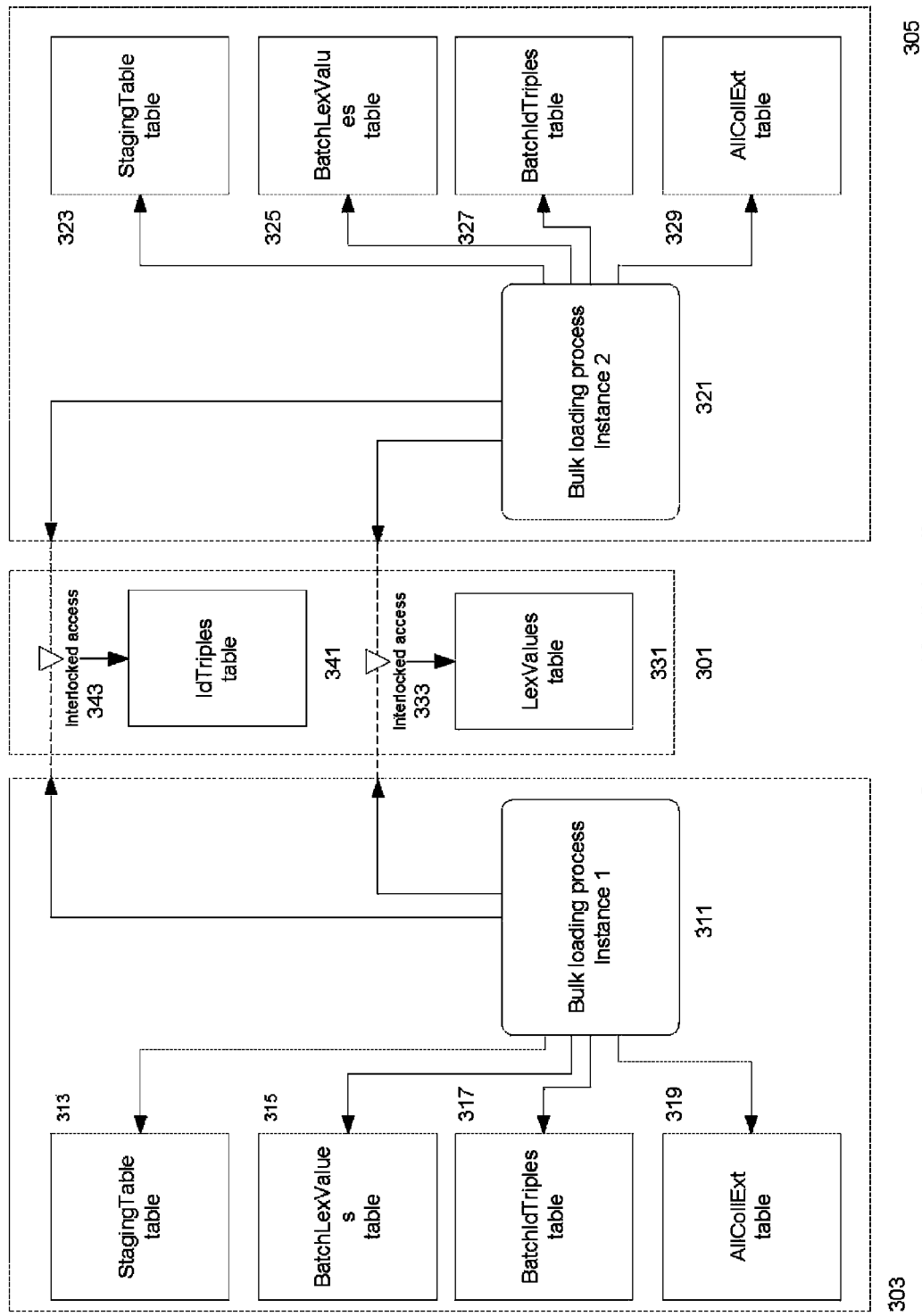
FIG. 3 illustrates bulk loading done concurrently.
Figure 4:
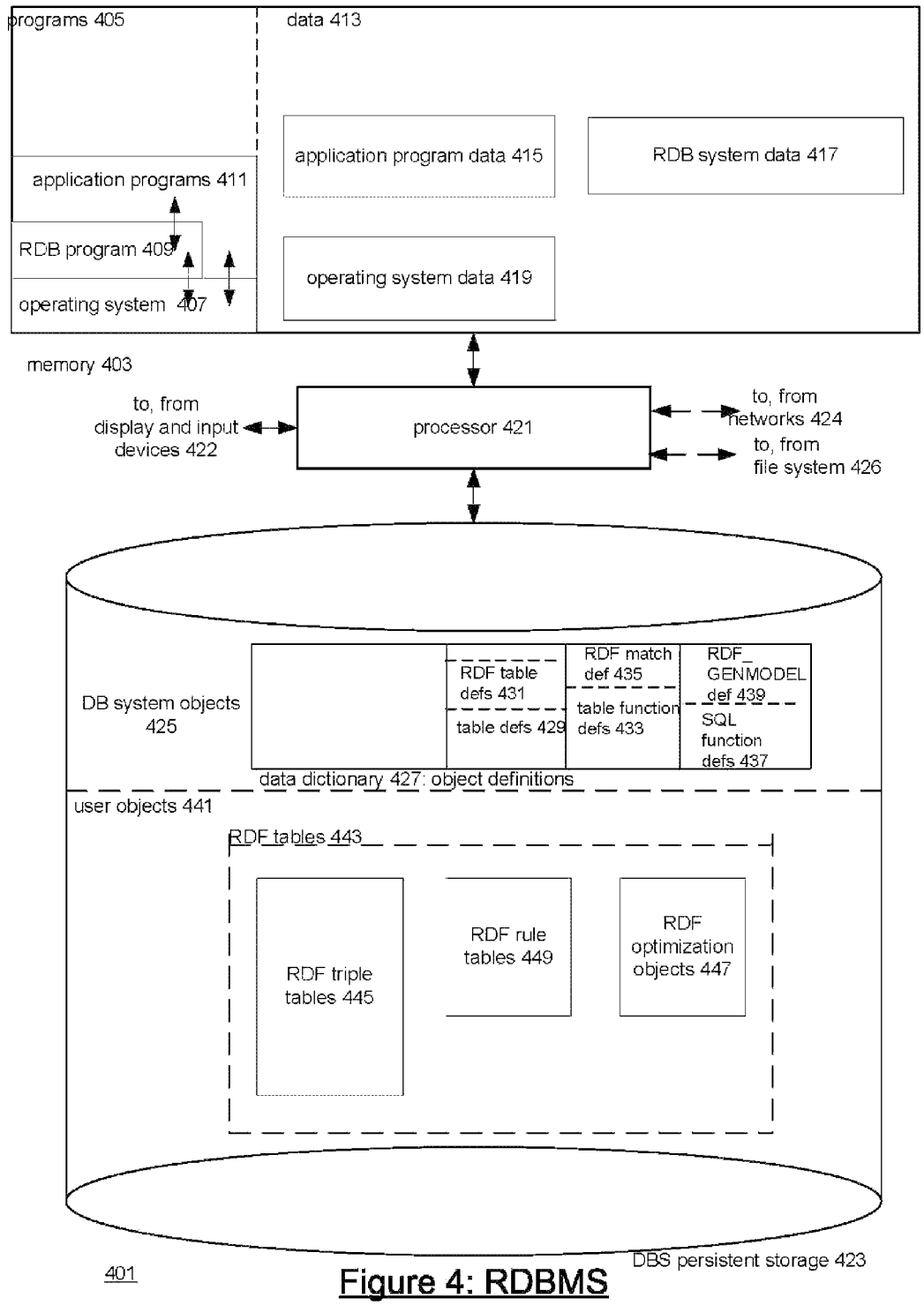
FIG. 4 is a block diagram of an RDBMS into which an RDF database has been integrated.

FIG. 3 illustrates the operation of concurrent bulk loading. FIG. 3 shows an exemplary first and second instance of a bulk loading process running, at 303 and 305, respectively. They share and coordinate access to the global tables, as shown at 301. Each process runs the same bulk loading program, and has its own set of working tables and local data. The two processes coordinate their access to the global tables.

The first instance 303 of a bulk loading process consists of the executing program for bulk loading 311, and its working tables, shown here as the StagingTable 313, the BatchLexValues table 315, the BatchIdTriples table 317, and the AllCollExt table 319. The executing program 311 is the only program that uses its working tables and local data: thus no coordination with other programs is required for these tables and data.

The second instance 305 of a bulk loading process consists of the executing program for bulk loading 321, and its working tables, shown here as the StagingTable 323, the BatchLexValues table 325, the BatchIdTriples table 327, and the AllCollExt table 329. The executing program 321 is the only program that uses its working tables and local: thus no coordination with other programs is required for these tables and data.

The global IdTriples table is shown at 341. As illustrated at 343, each of the two instances of the bulk loading program can access the IdTriples table, however the access is interlocked: by means of a locking function of the RDBMS or its operating system, each bulk loading process, such as process 311, will first attempt to lock the access to the specific partition of the IdTriples table for the model being bulk-loaded: if no other process has access to this partition of the table locked, the bulk loading process (311 in this example) gets to lock the access, and access the partition. Once the process has completed its use of or updating to the table, it unlocks access. Alternatively, the lock could be done on the entire IdTriples table, resulting in a somewhat lesser degree of concurrency.

If access to the table is already locked, the process attempting to lock waits, either automatically or in a loop, until the table is unlocked. At that point the process gets to lock the table for itself, and access the table.

Similarly, access to the global LexValues table 331 is locked, as shown at 333.

Thus, the use of each global table by the various instances, such as 311 and 321, of the bulk loading program are synchronized: only one process may access the locked table or resource at a time, and processes wait on each other for access.

While only one process at a time can thus access or update the IdTriples or the LexValues table, the other processes can be in other steps of processing concurrently, such as the steps for reading in files to their StagingTables, assigning initial UID values and canonicalizing values in their BatchLexValues tables, or filling in their BatchIdTriples tables with normalized UIDs. Further, one process can have locked and be accessing the global IdTriples table, while another has locked and is accessing the global LexValues table.

CONCLUSION

The foregoing Detailed Description has disclosed to those skilled in the relevant technologies how to generate hash values for instances of distinct data values according to the inventive techniques, how to make normalized representations of a batch of instances of data in a relational database management system according to those techniques, and how to compress data values which contain an internal delimiter according to those techniques. The Detailed Description has also disclosed the best mode presently known to the inventors of practicing their inventive techniques.

As disclosed in the Detailed Description, the inventive techniques are implemented in a relational database management system that includes tables that provide a normalized representation of one or more RDF models. The instances of distinct data values are lexical values from the RDF models and the lexical values are hashed according to the techniques of the invention to generate the UIDs for the normalized representation. Similarly, it is lexical values that contain URIs that are parsed according to the compression techniques of the invention. However, as has been already pointed out, and as will be readily apparent to those skilled in the relevant technologies, the inventive techniques may be employed in any situation in which distinct data values need to be mapped to UIDs, and thus for any situation in which normalized representations of data items are required. In the database context, the techniques permit normalization of data items without the use of JOIN operations to determine which UID corresponds to the data item being normalized. Determination of a prefix for compression by parsing may be employed not only with URIs, but also with any kind of data that includes internal delimiters.

As is apparent from the foregoing, aspects of the inventive techniques may be applied in environments other than those provided by RDBMS or other database systems. Details of the embodiment of the Detailed Description further depend on characteristics of the RDMS in which it is embodied and will differ for embodiments implemented using other RDBMS or database systems and for embodiments in environments other than database systems. Finally, as is well understood by those skilled in the relevant technologies, software allows countless ways of implementing the principles of the inventive techniques and the implementations will vary according to the purpose for which the inventive techniques are being used and the system upon which they are being implemented.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method of generating hash values for instances of distinct data values, each distinct data value being mapped to hash value generation information which describes how to generate a unique hash value for instances of the distinct data value and the method comprising:
using at least one processor to perform a process, the process comprising:
identifying a data value to be stored into a database within an RDF (Resource Description Format) model, wherein the data value is represented by a hashed internal identifier in an RDF triple in the RDF model;
generating the hashed internal identifier by executing a hash function to obtain a hash value that corresponds to the data value, the hash value being determined by using hash value generation information associated with the data value, wherein the hash value information corresponds to information that describes how to uniquely generate the hash value for the data value;
determining whether or not a collision occurs for the hash value;
upon determining an occurrence of the collision for the hash value, modifying the hash value generation information that is associated with the data value to obtain a modified hash value generation information; and
obtaining a new hash value using the modified hash value generation information.

2. The method of generating hash values set forth in claim 1, wherein the hash value generation information includes default hash value generation information, the default hash value information indicating that generation of the hash value by a default method does not result in the collision, and collision resolution hash value generation information, the collision resolution hash value generation information indicating how to generate the hash value when a prior generation thereof has resulted in the collision.

3. The method of generating hash values set forth in claim 2, wherein:
the default method generates the hash value by hashing the data value, and
the collision resolution hash value generation information indicates that the hash value is to be generated by combining another value with the data value to produce a combined value and hashing the combined value.

4. The method of generating hash values set forth in claim 3, wherein the other value is the hash value resulting from the prior generation.

5. The method of generating hash values set forth in claim 2, wherein:
the hash value generation information associated with the data value is indicated by mapping information that specifies data values which have been mapped to collision resolution hash value generation information, and
the process further comprises:
using the mapping information to determine whether the data value is mapped to collision resolution hash value generation information; and
when the data value is not so mapped, using the default method to generate the hash value for the data value.

6. The method of generating hash values set forth in claim 5, wherein:
the mapping information specifies the data values which have been mapped to the collision resolution hash value generation information by mapping the data values to the data values' respective collision resolution hash value generation information; and
the process further comprises:
when the data value is mapped to the collision resolution hash value generation in the mapping information, using the collision resolution hash value generation information from the mapping information to generate the hash value for the data value.

7. A computer program product comprising a non-transitory computer readable storage medium having stored thereupon computer executable instructions which, when executed by a computer processor, causes the computer processor to execute a process for generating hash values for instances of distinct data values, the process comprising:
using at least one processor to perform a process, the process comprising:
identifying a data value to be stored into a database within an RDF (Resource Description Format) model, wherein the data value is represented by a hashed internal identifier in an RDF triple in the RDF model;
generating the hashed internal identifier by executing a hash function to obtain a hash value that corresponds to the data value, the hash value being determined by using hash value generation information associated with the data value, wherein the hash value information corresponds to information that describes how to uniquely generate the hash value for the data value;
determining whether or not a collision occurs for the hash value;
upon determining an occurrence of the collision for the hash value, modifying the hash value generation information that is associated with the data value to obtain a modified hash value generation information; and
obtaining a new hash value using the modified hash value generation information.

8. The computer program product of claim 7, in which the hash value generation information indicates what mapping is to be performed on the data value.

9. The computer program product of claim 7, the process further comprising:
  performing a mapping on the data value to determine a first mapped data value; and
  determining whether there exists a collision between the first mapped data value and a second mapped data value that is determined by performing the mapping on a second data value of a set of data values.

10. The computer program product of claim 9, the process further comprising:
  determining whether the data value comprises a literal value that is in a canonical form; and
  transforming the data value into the canonical form when the data value is determined not to be in the canonical form.

11. The computer program product of claim 9, the action of performing the mapping on the data value comprising:
  selecting a default mapping without accounting for collision resolution, where a corresponding data value entry does not exist in a second mapping table.

12. The computer program product of claim 9, the action of performing the mapping on the data value comprising:
  identifying or determining a unique identifier for the data value by using the hash value or the new hash value, in which the unique identifier uniquely identifies the data value in the set of data values.

13. The computer program product of claim 7, wherein the hash value generation information includes collision resolution hash value generation information, the collision resolution hash value generation information indicating how to generate the new hash value when a prior generation thereof has resulted in a collision.

14. The computer program product of claim 13, wherein:
  the collision resolution hash value generation information indicates that the new hash value is to be generated by combining another value with the data value to produce a combined value and hashing the combined value.

15. The computer program product claim 14, wherein the process further comprises:
  using mapping information to determine whether the data value of the instance is mapped to the collision resolution hash value generation information; and
  using the default method to generate the hash value for the instance when the data value of the instance is not so mapped.

16. The computer program product of claim 15, wherein the process further comprises:
  using the collision resolution hash value generation information from the mapping information to generate the new hash value for the data value when the data value is mapped to the collision resolution hash value generation in the mapping information.

17. A system for generating hash values for instances of distinct data values, each distinct data value being mapped to hash value generation information which describes how to generate a unique hash value for instances of the distinct data value, comprising:
  at least one processor of a computing system that is to:
  identify a data value to be stored into a database within an RDF (Resource Description Format) model and hash value generation information associated with the data value;
  generate the hashed internal identifier by executing a hash function to obtain a hash value that corresponds to the data value, the hash value being determined by using hash value generation information associated with the data value, wherein the hash value information corresponds to information that describes how to uniquely generate the hash value for the data value;
  determine whether or not a collision occurs for the hash value;
  upon determining an occurrence of the collision for the hash value, modify the hash value generation information that is associated with the data value to obtain a modified hash value generation information; and
  obtain a new hash value using the modified hash value generation information.

18. The system of claim 17, in which the hash value generation information indicates what mapping is to be performed on the data value.

19. The system of claim 17, in which the at least one processor us further to:
  perform a mapping on the data value to determine a first mapped data value; and
  determine whether there exists the collision between the first mapped data value and a second mapped data value that is determined by performing the mapping on a second data value of a set of data values.

20. The system of claim 19, in which the at least one processor us further to:
  determine whether the data value comprises a literal value that is in a canonical form; and
  transform the data value into the canonical form when the data value is determined not to be in the canonical form.

21. The system of claim 19, in which the at least one processor that is to perform the mapping on the data value is further to:
  select a default mapping without accounting for collision resolution, where a corresponding data value entry does not exist in a second mapping table.

22. The system of claim 19, in which the at least one processor that is to perform the mapping on the data value is further to:
  identify or determine a unique identifier for the data value by using the hash value or the new hash value, in which the unique identifier uniquely identifies the data value in the set of data values.

23. The system of claim 17, wherein the hash value generation information includes collision resolution hash value generation information, the collision resolution hash value generation information indicating how to generate the new hash value when a prior generation thereof has resulted in the collision.

24. The system of claim 17, wherein:
  the collision resolution hash value generation information indicates that the new hash value is to be generated by combining another value with the data value to produce a combined value and hashing the combined value.

25. The system claim 24, wherein the at least one processor that is to generate the hash value is further to:
  use mapping information to determine whether the distinct data value of the data value is mapped to the collision resolution hash value generation information; and
  use the default method to generate the hash value for the data value when the data value of the instance is not so mapped.

26. The system of claim 25, wherein the at least one processor that is to generate the new hash value is further to:
  use the collision resolution hash value generation information from the mapping information to generate the new hash value for the data value when the data value is mapped to the collision resolution hash value generation in the mapping information.

* * * * *

UNITED STATES PATENT AND TRADEMARK OFFICE
CERTIFICATE OF CORRECTION

PATENT NO. : 8,768,931 B2
APPLICATION NO. : 13/323707
DATED : July 1, 2014
INVENTOR(S) : Das et al.

It is certified that error appears in the above-identified patent and that said Letters Patent is hereby corrected as shown below:

Title Page: Item 75, line 5, delete "Jogannathan" and insert -- Jagannathan --, therefor.

In the Drawings:

On sheet 14 of 22, in figure 14, under Reference Numeral 1424, line 1, delete "inOld" and insert -- in Old --, therefor.

In the Specification:

In column 1, line 20, delete "EDFS/OWL" and insert -- RDFS/OWL --, therefor.

In column 2, line 28, delete "* Immune Disorder*)" and insert -- "Immune Disorder") --, therefor.

In column 3, lines 7-15, delete "Also belonging to Schema 111 but not shown there is the built-in RDF predicate rdf:type. This predicate defines the subject of a triple that includes the rdf:type predicate as an instance of the class indicated by the object. As will be explained in more detail, RDF rules determine logical relationships between classes. For example, a built-in RDF rule states that the rdfs:subClassof relationship is transitive: if A is a subclass of B and B a subclass of C, then A is a subclass of C. Thus, the class Faculty is a subclass of Person." and insert the same on Col. 3, Line 6, after "conference." as a continuation of the same paragraph.

In column 5, line 6, delete "RDRMS" and insert -- RDBMS --, therefor.

In column 7, line 26, delete "tablet." and insert -- tables. --, therefor.

In column 7, line 34, delete "queries 006" and insert -- queries006 --, therefor.

Signed and Sealed this
Seventeenth Day of March, 2015

Michelle K. Lee
*Director of the United States Patent and Trademark Office*

CERTIFICATE OF CORRECTION (continued)
U.S. Pat. No. 8,768,931 B2

In column 8, line 30, delete "ModeID" and insert -- ModelID --, therefor.

In column 9, line 26, delete "Reviewers Id" and insert -- ReviewersId --, therefor.

In column 9, line 28, delete "FarmersId" and insert -- FarmersId --, therefor.

In column 9, line 64, delete "representation" and insert -- representation. --, therefor.

In column 11, line 37, delete "Lexvalues" and insert -- LexValues --, therefor.

In column 11, line 45, delete "However." and insert -- However, --, therefor.

In column 15, line 4, delete "Detail." and insert -- detail. --, therefor.

In column 15, line 61, delete "resolutions;" and insert -- resolutions, --, therefor.

In column 16, line 14, delete "Lexvalues" and insert -- LexValues --, therefor.

In column 18, line 51, delete "choice" and insert -- choice, --, therefor.

In column 19, lines 32-33, delete "Lexvalues" and insert -- LexValues --, therefor.

In column 22, line 26, delete "described," and insert -- described. --, therefor.

In column 24, line 6, delete "Uids" and insert -- UIDs --, therefor.

In column 24, line 12, delete "bulk," and insert -- bulk --, therefor.

In column 25, line 7, delete "stagingTable" and insert -- StagingTable --, therefor.

In column 28, line 46, delete "Old_collisions" and insert -- Old collisions --, therefor.

In column 30, line 7, delete "UD" and insert -- UID --, therefor.

In column 32, line 22, delete "Will" and insert -- will --, therefor.

In column 40, line 4, delete "lexval-suf fix" and insert -- lexval-suffix --, therefor.

In column 40, line 31, delete "lexval-suf fix" and insert -- lexval-suffix --, therefor.

In column 40, line 59, delete "lexval-pre fix" and insert -- lexval-prefix --, therefor.

In column 41, line 43, delete "lexval-pre fix" and insert -- lexval-prefix --, therefor.

In column 42, line 52, delete "RDBS" and insert -- RDBMS --, therefor.

CERTIFICATE OF CORRECTION (continued)
U.S. Pat. No. 8,768,931 B2

In column 45, line 16, delete "RDMS" and insert -- RDBMS --, therefor.

In the Claims

In column 47, line 36, in Claim 15, delete "product" and insert -- product of --, therefor.

In column 48, line 49, in Claim 25, delete "system" and insert -- system of --, therefor.